US007013087B2

(12) United States Patent
Suzuki et al.

(10) Patent No.: US 7,013,087 B2
(45) Date of Patent: Mar. 14, 2006

(54) COMMUNICATION SYSTEM USING OPTICAL FIBERS

(75) Inventors: Yasunori Suzuki, Yokohama (JP); Ning Chen, Yokohama (JP); Yoshiaki Tarusawa, Yokosuka (JP); Toshio Nojima, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 684 days.

(21) Appl. No.: 09/983,705

(22) Filed: Oct. 25, 2001

(65) Prior Publication Data

US 2002/0048071 A1 Apr. 25, 2002

(30) Foreign Application Priority Data

Oct. 25, 2000 (JP) ............................. 2000-326112
Dec. 19, 2000 (JP) ............................. 2000-385018

(51) Int. Cl.
*H04B 10/00* (2006.01)
*H04B 10/24* (2006.01)
*H04B 7/00* (2006.01)
*H04J 14/00* (2006.01)

(52) U.S. Cl. ......................... 398/115; 398/116; 398/43; 398/41; 370/310; 370/277

(58) Field of Classification Search ................ 398/115, 398/116, 141, 41–43; 370/328, 329, 339, 370/338, 310, 277; 455/422, 422.1
See application file for complete search history.

(56) References Cited

U.S. PATENT DOCUMENTS 5,561,851 A * 10/1996 Hubbell et al. ............. 455/512
5,896,369 A 4/1999 Warsta et al.
6,049,593 A 4/2000 Acampora
6,185,198 B1 * 2/2001 LaDue ....................... 370/329
6,490,446 B1 * 12/2002 Haartsen .................. 455/422.1
6,539,028 B1 * 3/2003 Soh et al. ................... 370/445
6,560,213 B1 * 5/2003 Izadpanah et al. .......... 370/338

FOREIGN PATENT DOCUMENTS

| | | |
|---|---|---|
| EP | 0 805 569 | 11/1997 |
| JP | 4-227149 | 8/1992 |
| JP | 5-122135 | 5/1993 |
| JP | 9-135479 | 5/1997 |
| JP | 9-505951 | 6/1997 |
| JP | 11-308167 | 11/1999 |
| JP | 11-340953 | 12/1999 |
| JP | 2000-138644 | 5/2000 |
| JP | 2000-147306 | 5/2000 |

* cited by examiner

*Primary Examiner*—M. R. Sedighian
*Assistant Examiner*—Quan-Zhen Wang
(74) *Attorney, Agent, or Firm*—Oblon, Spivak, McClelland, Maier & Neustadt, P.C.

(57) ABSTRACT

A divider/combiner unit combines RF signals, then converts the combined signal into an optical signal and sends it over an optical fiber. N radio access units each convert the optical signal received from the optical fiber into an RF signal and transmits it from an antenna, and each radio access unit converts an RF signal received by the antenna into an optical signal and sends it over an optical fiber to the divider/combiner unit. The divider/combiner unit converts the received optical signal into RF signals and outputs them. This system is operated as plurality of communication systems in common to them in correspondence to a plurality of input/output terminals of the divider/combiner unit.

23 Claims, 15 Drawing Sheets

FIG. 1
PRIOR ART
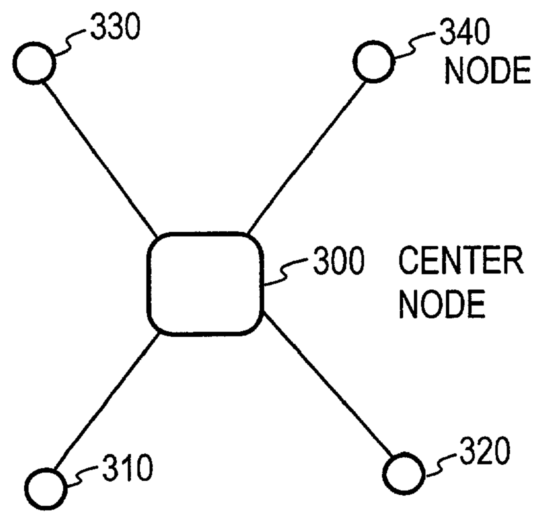
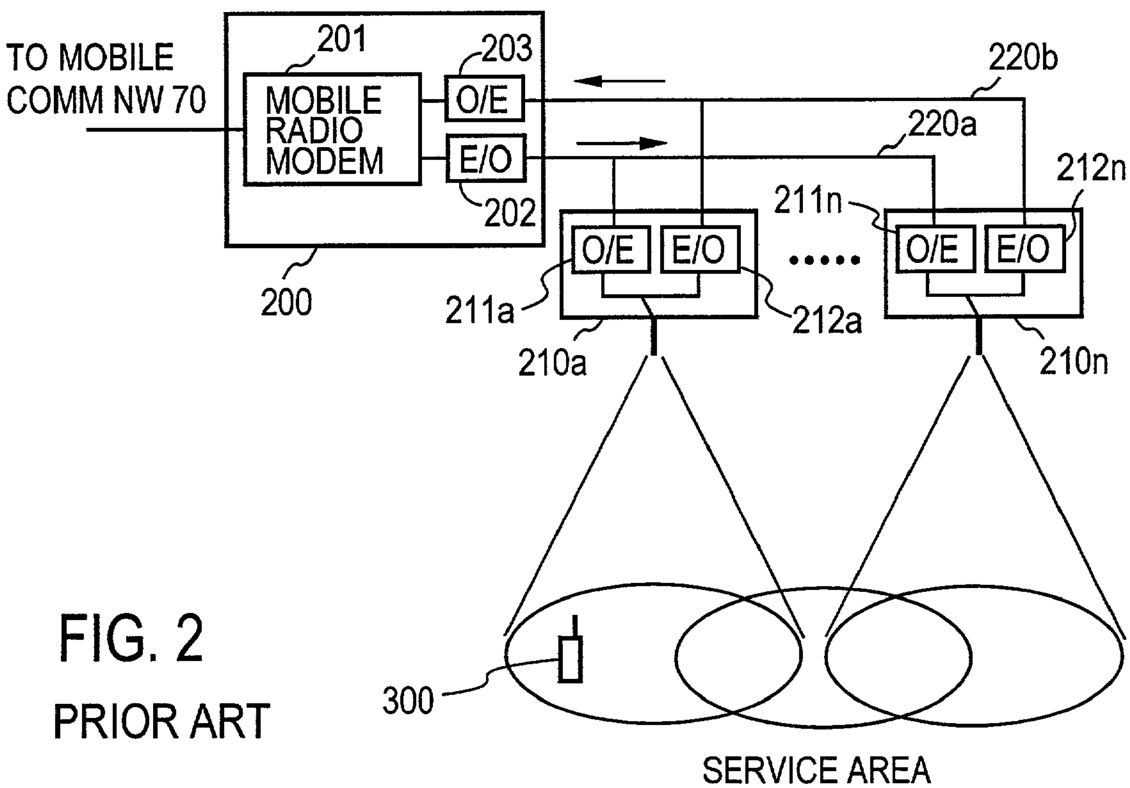
FIG. 2
PRIOR ART

COMMUNICATION SYSTEM USING OPTICAL FIBERS

BACKGROUND OF THE INVENTION

The present invention relates to a communication system having radio access units connected to optical fibers.

Conventionally, a wireless local area network (LAN) is used indoors for radio communications between computer terminals. The wireless LAN involves no wire connection of a terminal to a LAN connecting port, and hence it provides greater flexibility in the placement of terminals than does LAN that requires wire connection between computer terminals.

The wireless LANs known so far are, for example, a radio system in the unlicensed ISM (Industrial Scientific and Medical) band at 2.4 GHz using a spread spectrum scheme, a radio channel access method using OFDM (Orthogonal Frequency Division Multiplexing) scheme at 5 GHz according to IEEE802.11 and IEEE1394, and the Buletooth (short distance radio communication scheme) using the spread spectrum scheme based on the frequency hopping system.

These wireless LANs mostly employ such a star network as shown in FIG. 1. The star network has a center node 300 at the center of the network and plural nodes 310 to 340 connected to the center node 300. There is also used a combinatorial wireless LAN wherein multiple center nodes of such star networks are connected by cables.

On the other hand, there has recently been put to practical use an indoor transmission system that permits the use of portable telephones and mobile stations in dead zones such as underground shopping areas, buildings and tunnels (Japanese Pat. Laid-Open Gazette No. 284837/97). The indoor transmission system comprises, as depicted in FIG. 2, a base station unit 200, radio access units 210*a* to 210*n*, and optical fibers 220*a* and 220*b*.

The base station unit 200 comprises a mobile radio modem 201, an E/O (Electrical/Optical) converter 202 for converting an electric signal to an optical signal, and an O/E (Optical/Electrical) converter 203 for converting an optical signal to an electric signal. The base station unit 200 and the radio access units 210*a* to 210*n* are connected to the optical fibers 220*a* and 220*b*. The radio access units 210*a* to 210*n* have O/E converters 211*a* to 211*n* for converting an optical signal to an electric signal and E/O converters 212*a* to 212*n* for converting an electric signal to an optical signal.

In FIG. 2, a radio-frequency signal (an RF signal) sent from a mobile station 300 is received, for example, by the radio access unit 210*a*, wherein it is converted by the E/O converter 212*a* to an optical signal. The optical signal is sent via the optical fiber 220*b* to the base station unit 200, wherein it is converted by the O/E converter 203. The signal thus converted to an electric signal is demodulated by the mobile radio modem 201 as predetermined for connection to a mobile communication network 70.

On the other hand, a signal from the mobile communication network 70 is modulated by the modem 201 as predetermined and converted by the E/O converter 202 into an optical signal, which is sent via the optical fiber 220*a* to the radio access units 210*a* to 210*n*. The radio access units 210*a* to 210*n* convert the received optical signal by 211*a* to 211*n* to an electric signal, and radiate radio waves to mobile stations 300. The mobile stations 300 receive the RF signals.

In the conventional system of FIG. 2, since radio access units send the same down-link radio signal, the radio zone configuration is virtually a single cell. On this account, the subscriber capacity of the indoor radio system is limited as compared with an outdoor radio system.

SUMMARY OF THE INVENTION

It is therefore an object of the present invention to provide increased subscriber capacity in a communication system that has plural radio access units connected to optical fibers used as basic transmission lines.

According to the present invention, there is provided a communication system which comprises:

down- and up-link optical fibers;

N radio access units, each of which has antenna means connected to said down- and up-link optical fibers, converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1; and a divider/combiner unit which: has a plurality of input/output terminals; forms first and second communication systems corresponding to said plurality of input/output terminals, together with said down- and up-link optical fibers and said N radio access units connected to said down- and up-link optical fibers, respectively; converts a down-link RF signal input to each of said input/output terminals into an optical signal, and sends the converted optical signal as said down-link optical signal via said down-link optical fiber to those of said radio access units corresponding said first and second communication systems; and converts said up-link optical signal, sent over said up-link optical fiber from said radio access units corresponding to said first and second communication systems, into an up-link RF signal, and providing said up-link RF signal input to each of said input/output terminal corresponding said first and second communication systems In the above communication system, said first and second communication systems are a mobile communication system and a wireless LAN communication system of different frequency bands.

Alternatively, said first and second communication systems are: a single-cell communication system in which said N radio access units are caused to function as a single cell corresponding to one of said plurality of input/output terminals; and a multi-cell communication system in which said N radio access units are caused to function as N multiple cells corresponding to the remaining N input/output terminals.

Alternatively, said first communication system is a system in which the single cell formed by said N radio access units is caused to operate K-fold corresponding to K of said plurality of input/output terminals, and said second communication system is a system in which the multiple cells formed by said N radio access units are caused to operate L-fold corresponding to the remaining L sets of input/output terminals, each set being composed of N input/output terminals.

Alternatively, said first and second communication systems are K communication systems which are implemented by K-fold operations of a single cell formed by said N radio access units, said K being an integer equal to or greater than 2.

Alternatively, said first and second communication systems are L communication systems which are implemented by L-fold operations of multiple cells formed by said N radio access units, said L being an integer equal to or greater than 2.

BRIEF DESCRIPTION OF THE DRAWINGS

FIG. 1 is a diagram showing an example of the network configuration of a wireless LAN;

FIG. 2 is a block diagram depicting the configuration of a conventional communication system wherein radio access units are connected to optical fibers;

DETAILED DESCRIPTION OF THE PREFERRED EMBODIMENTS

A detailed description will hereinafter be given, with reference to the accompanying drawings, of embodiments of the present invention.

Embodiment 1

Figure 3:
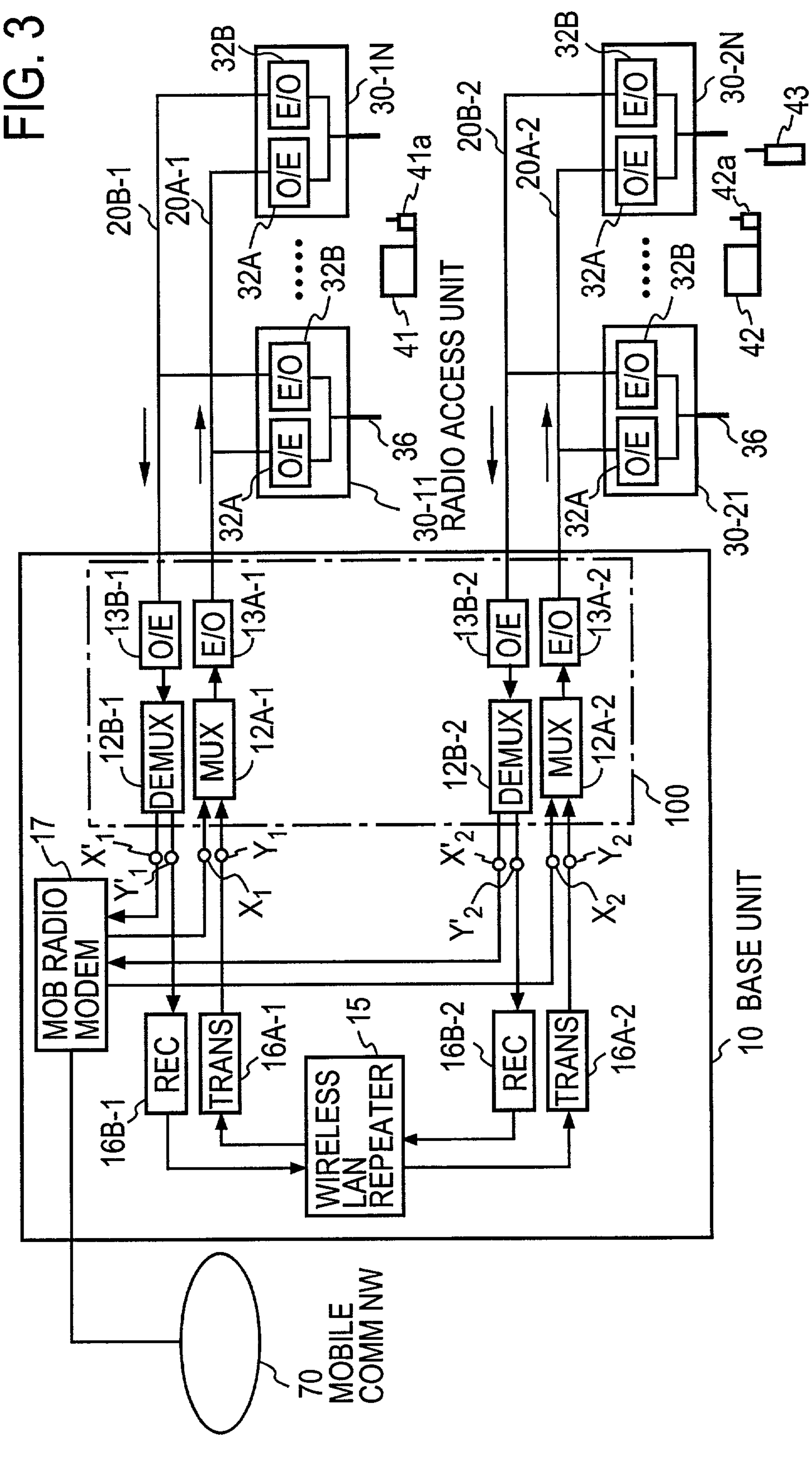
FIG. 3 is a block diagram illustrating the configuration of a communication system according to an embodiment of the present invention on which the wireless LAN system and the mobile communication system can be used as known.

FIG. 3 illustrates in block form a first embodiment of the present invention. According to this embodiment, in a divider/combiner unit 100, high-frequency signal of a mobile communication and a wireless LAN are multiplexed and then converted from electrical to optical form, thereafter being sent to radio access units over the same optical fiber; in this way, the mobile communication system and the wireless LAN system are implemented on the same communication system. This communication system has high cost-performance for the utilization of hybrid systems.

As depicted in FIG. 3, the communication system comprises: a center node (hereinafter referred to as a base unit) 10; radio access units 30-11 to 30-1N and 30-21 to 30-2N (hereinafter identified by 30); wireless LAN system terminals 41 and 42; radio channel access units 41*a* and 42*a*; a mobile terminal 43 connectable to a mobile communication network (which terminal will hereinafter be referred to as a mobile communication terminal): and optical fibers 20A-1, 20B-1, 20A-2 and 20B-2.

The base unit 10 is provided with: a wireless LAN repeater 15; a mobile radio modem 17; transmitters 16A-1, 16A-2; receivers 16B-1, 16B-2; multiplexers 12A-1, 12A-2; demultiplexers 12B-1, 12B-2; E/O converters 13A-1, 13A-2; and O/E converters 13B-1, 13B-2. The mobile radio modem 17 is connected to the demultiplexers 12B-1, 12B-2 and the multiplexers 12A-1, 12A-2. The multiplexers 12A-1, 12A-2, the demultiplexers 12B-1, 12B-2, the E/O converters 13A-1, 13A-2 and the O/E converters 13B-1, 13B-2 constitute the divider/combiner unit 100. The wireless LAN repeater 15, the transmitters 16A-1, 16A-2 and the receivers 16B-1, 16B-2 constitute wireless LAN repeater means.

Each radio access unit 30 has an O/E converter 32A and an E/O converter 32B. The wireless LAN system terminals 41, 42 and the mobile communication terminal 43 operate at different radio frequencies. For example, the radio frequency for the wireless LAN system terminals 41, 42 is in a 2.4 GHz band, the radio frequency for the mobile communication terminal 43 is in a 1.5 GHz band.

In FIG. 3, the RF signal to be sent from the wireless LAN system terminal 41 or mobile communication terminal 43 is converted to an optical signal in the radio access unit 30 and received by the base unit 10 via the optical fiber line. The base unit 10 separates the radio bands of the wireless LAN system terminal 41 and the mobile communication terminal 43, and relays the signal from the wireless LAN system terminal 41 via the LAN repeater 15 to the other wireless LAN system terminal 42. On the other hand, the signal from the mobile communication terminal 43 is demodulated by the mobile radio modem 17 as predetermined for transmission to the mobile communication network 70.

Next, a detailed description will be given of communication from the wireless LAN system terminal 42 to the other wireless LAN system terminal 41 in the communication system depicted in FIG. 3. The wireless LAN system terminal 42 radiates an RF signal (prescribed for the wireless LAN) out into space from the radio channel access unit 42*a* (for example, a wireless modem) connected to the terminal 42. The RF signal is received by an antenna 36 of the radio access unit 30 in the neighborhood of the wireless LAN system terminal 42. Let it be assumed in this case that the RF signal be received by the radio access unit 30-21.

Upon receiving the RF signal, the radio access unit 30-21 makes a gain adjustment to the received signal, and then provides it to the E/O converter 32B. The E/O converter 32B has a built-in semiconductor laser diode, and intensity-modulates the drive current of the semiconductor diode by the received RF signal for its conversion to an optical signal. The thus intensity-modulated optical signal is sent via the optical fiber 20B-2 to the divider/combiner unit 100. The divider/combiner unit 100 receives the optical signal by a photodiode of the O/E converter 13B-2 to convert it to an electric signal. Usually, the photodiode of the O/E converter 13B-2 receives optical signals over the optical fiber 20B-2 from the plurality of radio access units 30-21 to 30-2N.

The thus converted electric signal is separated by the demultiplxer 12B-2 into an RF signal of the mobile communication band and an RF signal of the wireless LAN band. For example, the mobile communication band is a 1.5 GHz band, and the wireless LAN band is a 2.4 or 5 GHz band. The demultiplxer 12B-2 can be formed by filters of different frequency characteristics. The demultiplxer 12B-2 provides the RF signal of the wireless LAN band from a terminal $Y'_2$ to the receiver 16B-2 and the RF signal of the mobile communication band from a terminal $X'_2$ to the mobile radio modem 17.

The receiver 16B-2 demodulates the RF signal received from the demultiplexer 12B-2, and then outputs the demodulated signal to the wireless LAN repeater 15. The wireless LAN repeater 15 has stored therein a predetermined wireless LAN protocol, and performs routing or like relay processing for connecting the demodulated signal to the destination wireless LAN system terminal (the wireless LAN system terminal 41) based on the source address information and destination address information read out from the header of a packet signal contained in the demodulated signal. As a result, the wireless LAN repeater 15 sends the signal, for example, to the transmitter 16A-1, wherein the signal is converted to an RF signal of the wireless LAN band, which is fed via a terminal $Y_1$, to the multiplexer 12A-1, wherein it is band-combined with an RF signal of the mobile communication band fed from the mobile radio modem 17 via a terminal $X_1$. The multiplexer 12A-1 can be formed by filters of different frequency characteristics.

The RF signal thus band-combined by the combiner 12A-1 is converted to an optical signal through intensity modulation by a semiconductor laser diode of the E/O converter 13-A. The optical signal is sent over the optical fiber 20A-1 to each of the radio access units 30-11 to 30-1N, wherein it is converted by the O/E converter 32A to an RF signal, which is radiated out into space from the antenna 36 of the radio access unit 30. The wireless LAN system terminal 41 receives the RF signal by the radio channel access unit 41*a*, and after predetermined demodulation of the received signal, the terminal 41 can communicate with the wireless LAN system terminal 42.

Next, a description will be given of the procedure by which to carry out communications using the mobile communication terminal 43 in the communication system of FIG. 3. In FIG. 3, the RF signal sent from the mobile communication terminal 43 is received by the neighboring radio access unit 30. Assume in this instance that the RF signal be received by the radio access unit 30-21. The RF signal received by the radio access unit 30-21 is converted by the E/O converter 32B to an optical signal, which is transmitted over the optical fiber 20B-2 to the base unit 10.

The optical signal is converted by the O/E converter 13B-2 to an electric signal, which is fed into the demultiplexer 12B-2. The electric signal is separated by the demultiplexer 12B-2 into an RF signal of the mobile communication band and the wireless LAN band. The RF signal of the mobile communication band is input to the mobile communication modem 17, wherein it is demodulated as predetermined. On the other hand, the RF signal of the wireless LAN band is fed via the receiver 16B-2 to the wireless LAN repeater 15 as referred to previously.

The RF signal of the mobile communication band, demodulated by the mobile communication modem 17, is sent to the mobile communication network 70, wherein it is subjected to predetermined processing for connection to the destination mobile communication terminal, allowing the communication therewith of the source mobile communication terminal 43.

In such a communication system, for example, in the case where the radio access units 30-11 to 30-1N are installed on the first floor of a two-storied building, the radio access units 30-21 to 30-2N on the second floor and the base unit 10 at an arbitrary position, communications between the wireless LAN system terminals on the first and second floors are carried out via the wireless LAN repeater 15. Thus, a single wireless LAN can be implemented in the building; hence, a wireless LAN of a relatively large scale can be constructed.

Since this communication system enables the radio access unit 30 to simultaneously send the RF signal for the wireless LAN and the RF signal of the mobile communication, the mobile communication terminal can carry out communications with other mobile communication terminals via the wireless LAN system and via the mobile communication network 70.

In such a communication system, the base unit receives the RF signal of the wireless LAN and the RF signal of the mobile communication, then separates them into respective bands, and determines the destinations of the separated signals according to their frequency bands. That is, the base unit identifies the received RF signal, and when it is identified as the RF signal of the wireless LAN, the base unit performs relay processing for connection to the wireless LAN system terminal of the destination.

On the other hand, in the case of the RF signal of the mobile communication, the base unit performs processing for connection to the mobile communication terminal of the destination. Accordingly, the communication system of this embodiment permits implementation of communications between wireless LAN terminals and between mobile communication terminals.

As described above, according to the FIG. 3 embodiment, the communication system, which contains the divider/combiner unit 100, the optical fibers 20A, 20B, and the radio access unit 30-11 to 30-1N and 30-21 to 30-2N, operates as a communication system that can be connected to the mobile communication system via the pairs of terminals $X_1$, $X'_1$ and $X_2$, $X'_2$. Similarly, the communication system operates as a communication system that can be connected to the wireless LAN via the pair of terminals $Y_1$, $Y'_1$ and $Y_2$, $Y'_2$. Hence, the communication system of this embodiment has high cost-performance for utilization of hybrid systems regarding to the wireless LAN and the mobile communications network.

Embodiment 2

Figure 4:
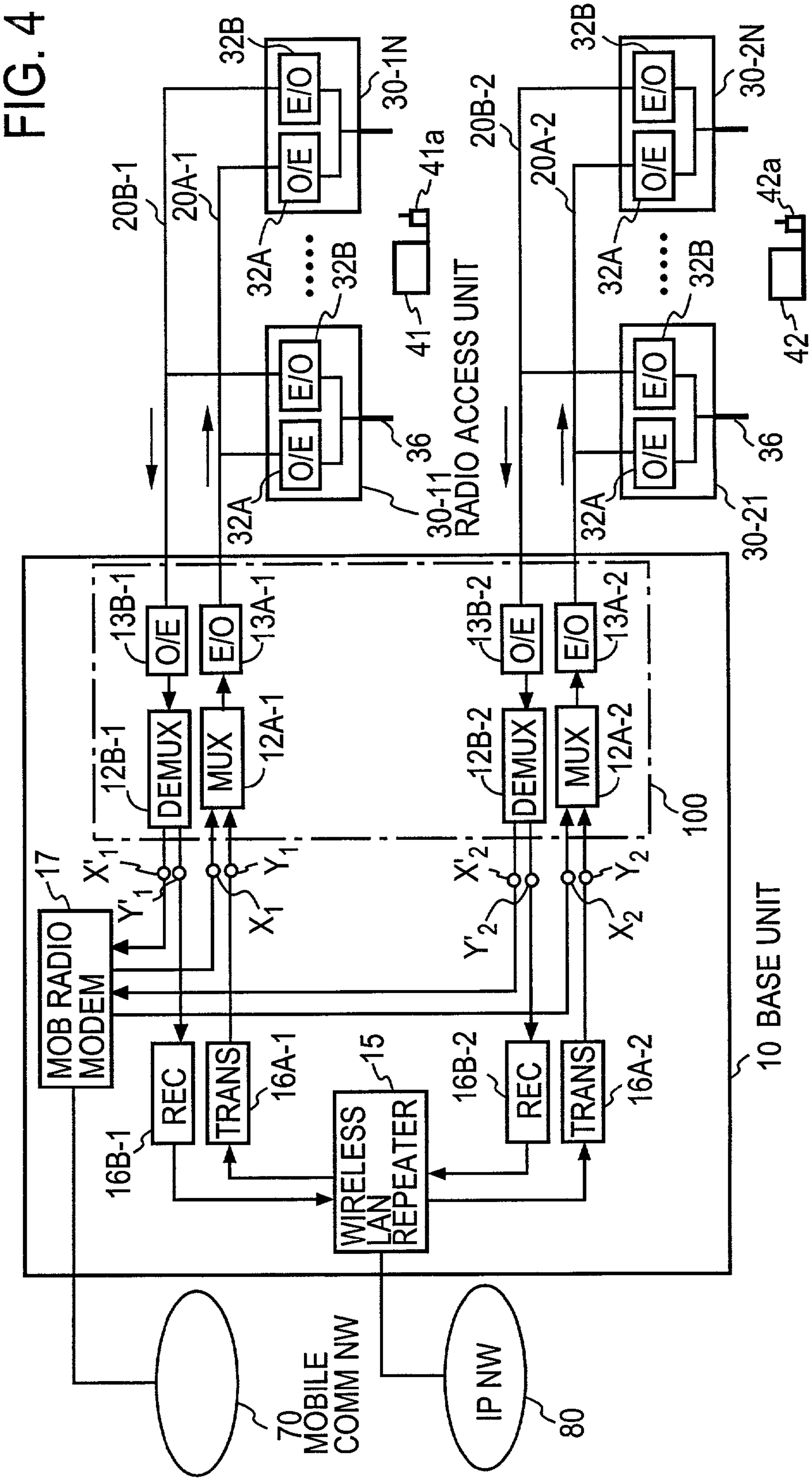
FIG. 4 is a block diagram showing the configuration that permits connection of the wireless LAN system to the Internet in the FIG. 3 embodiment.

FIG. 4 illustrates in block form a second embodiment of the communication system of the present invention. This embodiment is a modified form of the FIG. 3 embodiment, in which the wireless LAN system is adapted to be connectable to the Internet (an IP network). In the wireless LAN system in FIG. 4, the wireless LAN repeater 15 in the base unit 10 has a function of connection to an external communication network such, for example, as an IP network 80. This embodiment is exactly identical in construction with the FIG. 3 embodiment except the above.

That is, the incorporation of an Internet protocol in the wireless LAN repeater 15 enables the wireless LAN system terminal to be easily connected to the IP network, making it possible to receive communication services such as an access to the Internet and a file transfer. Accordingly, such a wireless LAN system offers a radio network environment equivalent to a wired one, hence providing increased mobility of users.

In the communication system of this embodiment the base unit performs external network connection processing for connecting the wireless LAN terminal to the IP network—this makes it possible, for example, to access the Internet or transfer files by radio from the wireless LAN system terminal.

Embodiment 3

Figure 5:
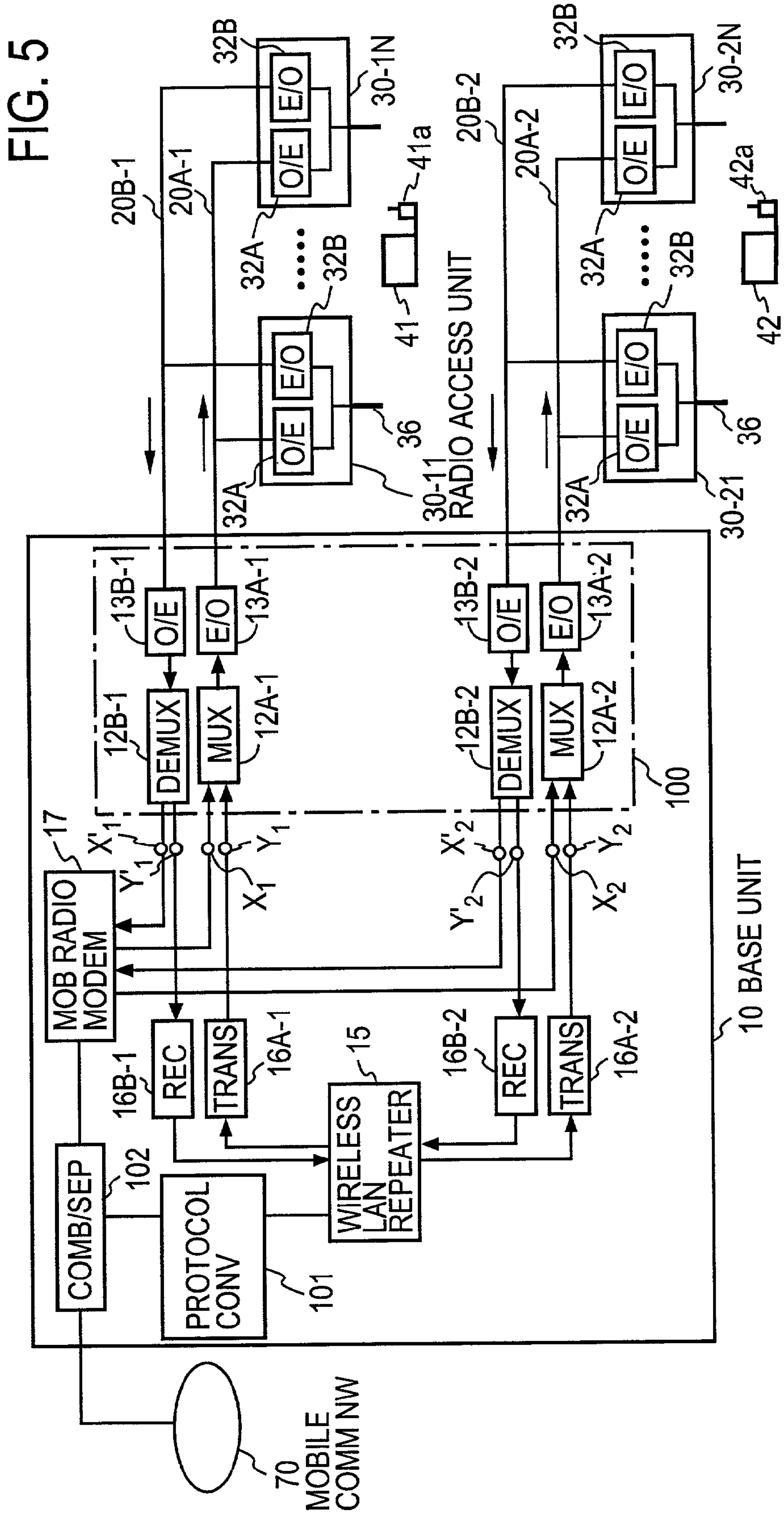
FIG. 5 is a block diagram showing the system configuration that permits connection of the wireless LAN system to a mobile communication network in the FIG. 3 embodiment.

FIG. 5 illustrates in block form a third embodiment of the communication system according to the present invention. This embodiment of another modified form of the FIG. 3 embodiment, in which the wireless LAN system is adapted to be connectable to the mobile communication network by protocol conversion. In the wireless LAN system of this embodiment the base unit 10 is further provided with a protocol converter 101 and a combiner/separator 102. Since the wireless LAN system and the mobile communication system use different communication protocols, the protocol converter 101 converts the communication protocol of the former to the communication protocol of that of the latter. The combiner/separator 102 combines the signal of the protocol converted by the protocol converter 101 with a signal from the mobile radio modem 17, then connects the combined signal to the mobile communication network 70. And at the same time it separates the signal addressed to the wireless LAN repeater 15 from the mobile communication network 70. This embodiment is also exactly identical in construction with the FIG. 3 embodiment except the above.

A description will be given below of the procedure by which the wireless LAN system terminal communicates with the mobile communication terminal.

Upon receiving an RF signal from the wireless LAN system terminal 42 by the radio access unit 30, its E/O converter 32B converts the RF signal to an optical signal. The thus converted optical signal is transmitted over the optical fiber 20B-2 to the divider/combiner unit 100. The divider/combiner unit 100 converts the optical signal by the O/E converter 13B-2 to an electric signal, which is fed into the demultiplexer 12B-2.

The demultiplexer 12B-2 separates the input electric signal into an RF signal of the wireless LAN radio band and an RF signal of the mobile communication radio band, and outputs the wireless LAN RF signal to the receiver 16B-2.

On the other hand, the receiver 16B-2 demodulates the wireless LAN RF signal, and provides the demodulated signal to the protocol converter 101 via the wireless LAN repeater 15. Based on protocol information contained in the demodulated signal, the protocol converter 101 converts the protocol of the wireless LAN to the protocol of the mobile communication network, and outputs the protocol-converted signal to the combiner/separator 102. The mobile radio modem 17 demodulates the mobile communication RF signal, and provides the demodulated signal to the combiner/separator 102.

The combiner/separator 102 multiplexes the protocol-converted signal from the protocol converter 101 and the demodulated signal from the mobile radio modem 17. In this case, if the network to be connected is a packet communication network, the multiplexed signal is connected intact thereto. The wireless LAN and mobile communication packets can be discriminated on the part of the packet network by containing packet identification information in the packet header.

When the network to be connected is a circuit switching network, a particular slot is assigned to the wireless LAN for connection. The signal thus multiplexed in the combiner/separator 10 is used in the packet network or circuit switching network in the mobile communication network 70 for connection to the destination mobile communication terminal. Upon completion of a sequence of connection processes in the mobile communication network 70, a connection is established between the source wireless LAN system terminal and the destination mobile communication terminal, allowing voice and data communications between them.

In this wireless LAN system, since the protocol converter 101 of the base unit 10 converts the protocol of the wireless LAN to the protocol of the mobile communication network, a communication can be carried out from the wireless LAN system terminal to the mobile communication terminal. As a result, the wireless LAN network and the mobile communication network can be handled apparently as a single network, that is, as a seamless network. Hence, users are allowed to receive, in addition to services offered by the wireless LAN system, a wide variety of services provided by the mobile communication network, for example, i-mode services in Japan. Further, by incorporating in the protocol converter 101 a function of converting the mobile communication network protocol to the wireless LAN protocol, it is possible to carry out a communication from the mobile communication terminal to the wireless LAN system terminal.

For example, in FIG. 5, a signal sent from the mobile communication terminal is input to the combiner/separator 102 of the base unit 10 via the mobile communication network 70. In the base unit 10 a signal to the wireless LAN is separated from the signal sent from the mobile communication network. That is, control information concerning the communication protocol and data information are separated. The control information associated with the communication protocol contains control information for communication and information like source and destination addresses.

In the protocol converter 101, the protocol information contained in the control information separated by the combiner/separator 102, in this case, the mobile communication protocol, is converted to the wireless LAN protocol, and the converted information is input to the wireless LAN repeater 15. On the other hand, the data information separated by the combiner/separator 102 is subjected to predetermined demodulation processing by the mobile radio modem 17.

The thus protocol-converted control information is modulated by the transmitters 16A-1 and 16A-2 and then input therefrom to the multiplexers 12A-1 and 12A-2 via terminals $Y_1$, and $Y_2$, respectively. The multiplexers 12A-1 and 12A-2 each multiplex the information demodulated by the mobile radio modem 17 and the protocol-converted control information. The multiplexed electric signals are converted by the E/O converters 13A-1 and 13A-2 into optical signals, which are sent over the optical fibers 21A-1 and 20A-2 to the radio access units 30-11 to 30-1N and 30-21 to 3-2N. The radio access units 30-11 to 30-1N and 30-21 to 30-2N each convert the optical signal into an RF signal, and radiate it out into space from the antenna 36.

When RF signals are radiated from the radio access units 30-21 to 30-1N and 30-21 to 30-2N, the destination wireless LAN terminal performs processing for connection to the neighboring radio access unit to establish a communication with the source terminal.

In such a wireless LAN system, since the wireless LAN system described above uses the protocol converter 101 to convert the mobile communication protocol to the wireless LAN protocol and vice versa, communications can be carried out from the mobile communication terminal to the wireless LAN system terminal and vice versa. That is, in this communication system wherein the protocol conversion is performed by the protocol converter 101 between the wireless LAN communication the mobile communication system, the wireless LAN system and a mobile communication system, for example, a PDC (Personal Digital Cellular) or CDMA (Code Division Multiple Access) mobile communication system, can be handled as a single network apparently as if they are connected to each other. Accordingly, the wireless LAN system and the mobile communication system can be used as a seamless network.

Embodiment 4

Figure 6:
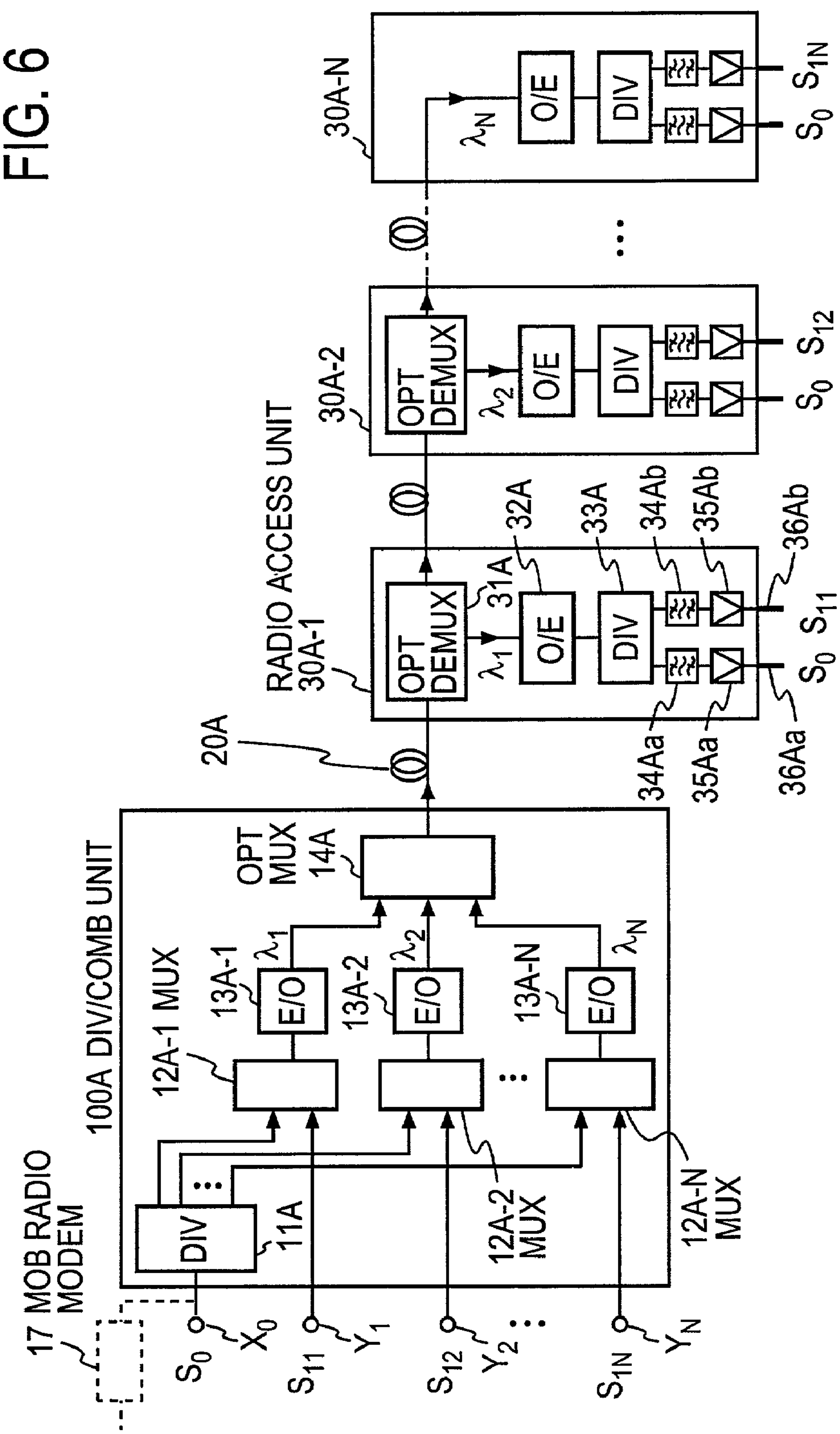
FIG. 6 is a block diagram showing the system configuration for a down-link signal in an embodiment of the communication system according to the present invention on which single- and multi-cell systems are implemented.
Figure 7:
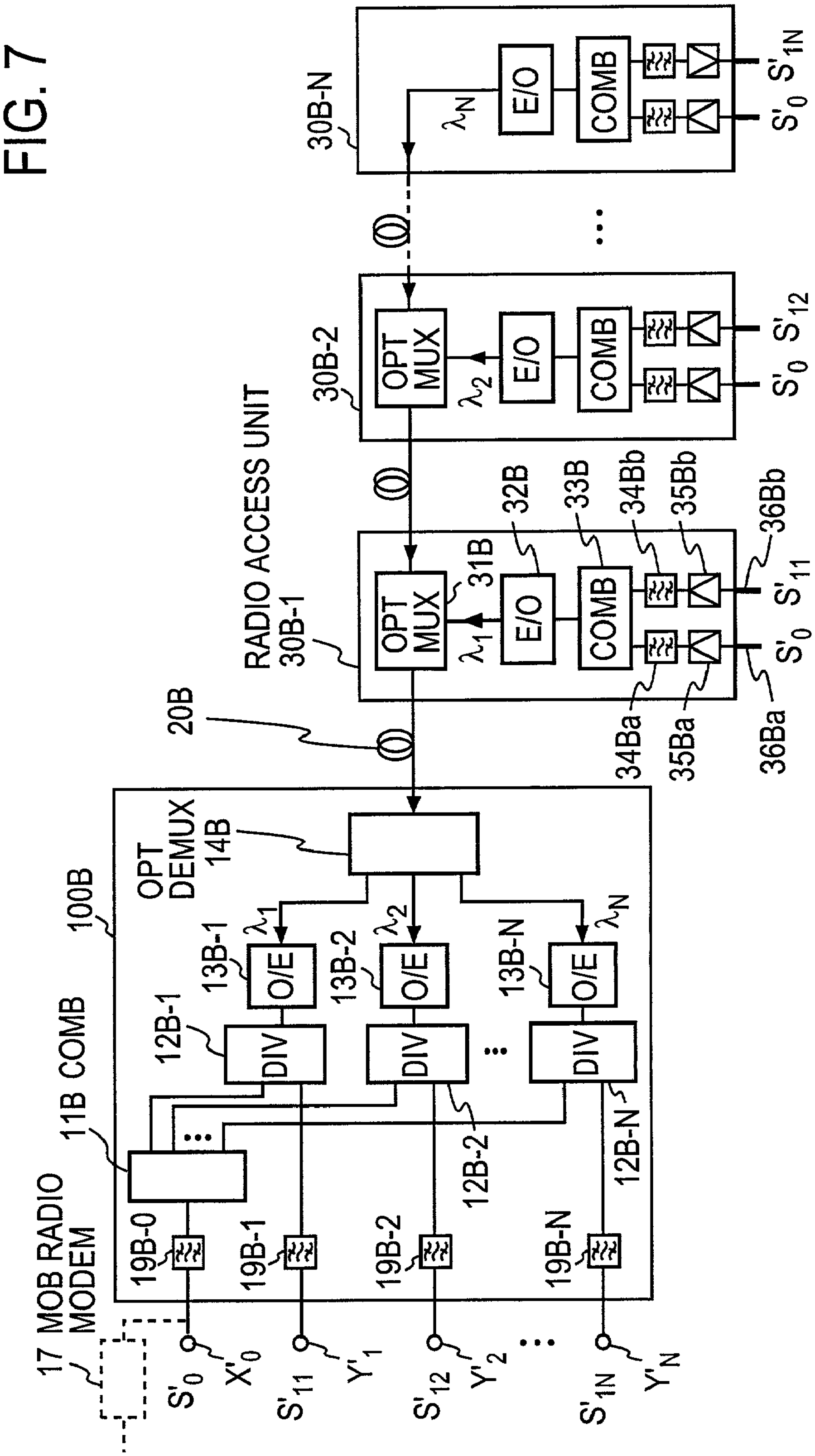
FIG. 7 is a block diagram depicting the system configuration for an up-link signal corresponding to the configuration of FIG. 6.

FIGS. 6 and 7 illustrate in block form a fourth embodiment of the communication system according to the present invention. With a view to providing increased cost-performance of the communication system, this embodiment is adapted to be usable as a multi-cell structure which allows individual access to N cells assigned to N radio access units and as a single-cell structure which covers the N cells and is accessible in common to the N cells.

FIG. 6 depicts only the system configuration for the down-link signal in the communication system, and FIG. 7 the system configuration for the up-link signal. These systems are formed integrally with each other as shown in the embodiments of FIGS. 3, 4 and 5.

In FIG. 6, reference character $S_0$ denotes a down-link RF signal of radio system of the single-cell structure. The down-link RF signal is sent to all the radio access units 30A-1 to 30A-N, from which it is ultimately transmitted as an RF signal. The frequency band of the RF signal $S_0$ will be identified by $F_0$. Incidentally, the sets of radio access units 30A-1 to 30A-N and the corresponding radio access units 30B-1 to 30B-N in FIG. 7 correspond to the radio access units 30-11 to 30-1N and 30-21 to 30-2N in FIGS. 3, 4 and 5.

Figure 8A:
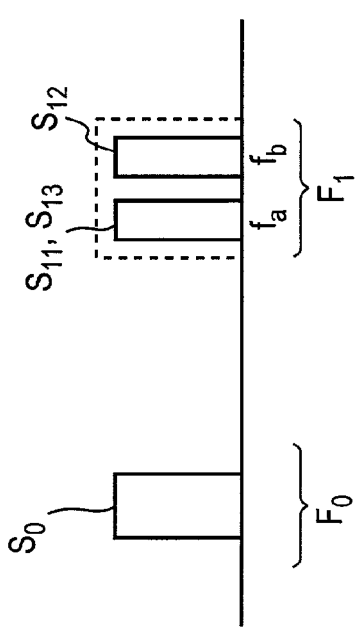
FIG. 8 is a diagram showing an example of the RF signal frequency set for each cell of a multi-cell communication system.
Figure 8B:
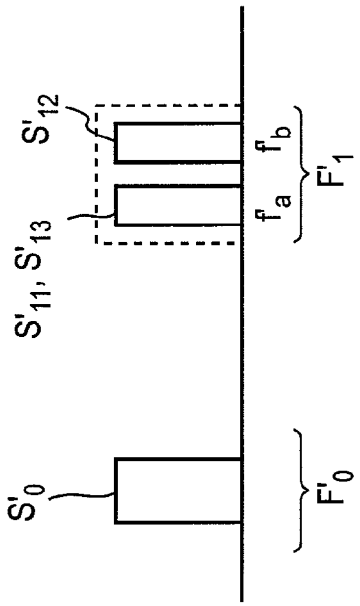
Figure 8C:
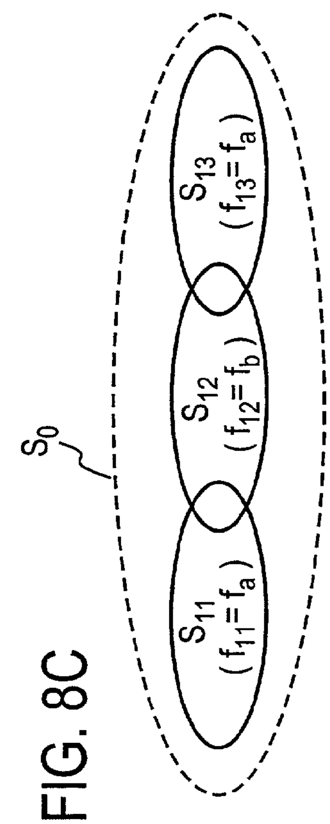

Signals $S_{11}$, $S_{12}$, . . . , $S_{1N}$ are down-link RF signal of the multi-cell structure radio system. The RF signal $S_{1i}$ is sent only to the radio access unit 30A-i (where i=1, 2, . . . , N), from which it is ultimately transmitted as an RF signal. The frequency band for all of the signals $S_{11}$ to $S_{1N}$ will be identified by $F_1$; this frequency band differs from the frequency band $F_0$. The frequency of each of the signals $S_{11}$ to $S_{1N}$ will be denoted by $f_{1i}$, and its concrete value is determined by design specifications such as the position of placement of the radio access unit (cell) and the frequency reuse. For example, when the number N of radio access units is 3, the frequency bands of the signals $S_{11}$, to $S_{13}$ are set as shown in FIGS. 8A or 8C. That is, the frequency bands are set such that $f_{11}=f_{13}=f_a$ and $f_{12}=f_b$ in the three cells. The signals $S_{11}$ and $S_{13}$ repeatedly use the same frequency band $f_a$, but differ in their transmitting information.

In the divider/combiner unit 100A the signal $S_0$ is divided by a divider 11A into N signals. N multiplexers 12A-1 to 12A-N multiplex the signals $S_{11}$ to $S_{1N}$ and the divided signals $S_0$ from the divider 11A, respectively. The output signals from the multiplexers 12A-1 to 12A-N are converted by E/O converters 13A-1 to 13A-N into optical signals of different wavelengths $\lambda_1$ to $\lambda_N$. The optical wavelength of the output optical signal from the E/O converter 13A-i is $\lambda_i$. The N optical signals are multiplexed by an optical multiplexer 14A, and the multiplexed output is provided onto an optical fiber 20A.

In the radio access unit 30A-i, the optical signal on the optical fiber 20A is applied to an optical demultiplexer 31A inserted in the optical fiber 20A, by which the optical signal of the wavelength $\lambda_i$ is extracted. The optical signals of the other optical wavelengths pass through the optical demultiplexer 31A and propagate in the optical fiber 20A to the next radio access unit 30A-(i+1). The optical signal of the wavelength $\lambda_i$ is converted by an O/E converter 32A to an electric signal. The electric signal is divided by a divider 33A into two. The one output signal from the divider 33A is filtered by a filter 34Aa that permits the passage therethrough of only a signal of the frequency band $F_0$, and as a result, the signal $S_0$ is provided from the filter 34Aa. This signal is amplified by an amplifier 35Aa, and then radiated out as the RF signal $S_0$ into space from a first antenna 36Aa. The other output signal from the divider 33A is filtered by a filter 34Ab that permits the passage therethrough of only a signal of the frequency band $F_1$. For example, in the radio access unit 30A-1, the filter 34Ab outputs the signal $S_{11}$. (Generally speaking, in the radio access unit 30A-i, this output signal is $S_{1i}$.) The signal is amplified by an amplifier 35Ab, and then radiated out as the RF signal $S_{11}$, into space from a second antenna 36Ab.

Figure 8D:
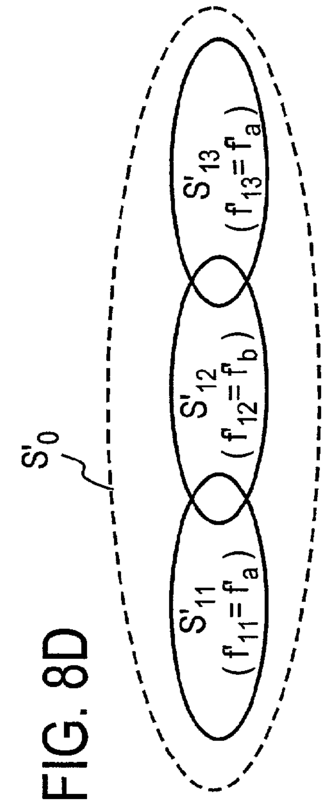

FIG. 7 depicts the system configuration for the up-link signal, which corresponds to the system configuration for the down-link signal shown in FIG. 6. Reference character $S'_0$ denotes an up-link RF signal of a single-cell radio system, which is sent from a radio terminal of a single-cell radio system. The frequency band of the signal $S'_0$ is denoted by $F'_0$. Reference characters $S'_{11}$, $S'_{12}$, . . . , $S'_{1N}$ denote up-link RF signals of a multi-cell radio system, which are each sent from radio terminal of a multi-cell radio system in the vicinity of an i-th radio access unit. The frequency band for all of the signals $S'_{11}$ to $S'_{1N}$ will be denoted by $F'_1$; this frequency band differs from the frequency band $F'_0$. The frequency band of each of the signals $S'_{11}$ to $S'_{1N}$ will be denoted by $f'_{1i}$, and its concrete value is determined by design specifications such as the position of placement of the radio access unit (cell) and the frequency reuse as mentioned previously. FIGS. 8B and 8D show an example of the setting of the frequency band $f'_{1i}$. In this example, when the number N of radio access units is 3, the frequency bands of the signals $S'_{11}$ to $S'_{13}$ are set as shown in FIGS. 8A or 8C. That is, the frequency bands are set such that $f'_{11}=f'_{13}=f'_a$ and $f'_{12}=f'_b$ in the three cells. The signals $S'_{11}$ and $S'_{13}$ repeatedly use the same frequency band $f'_a$, but differ in their transmitting information.

In a radio access unit 30B-i, an antenna 36Ba capable of receiving an RF signal of the frequency band $F'_0$ receives the above-mentioned signal $S'_0$, and an antenna 36Bb capable of receiving an RF signal of the frequency band $F'_1$ receives the above-mentioned signal $S'_{1i}$.

The RF signal received by the antenna 36Ba is amplified by an amplifier 35Ba, and the amplified signal is filtered by a filter 34Ba that permits the passage therethrough of a signal of the frequency band $F'_0$. The RF signal received by the antenna 36Bb is amplified by an amplifier 35Bb, and the amplified signal is filtered by a filter 34Bb that permits the passage therethrough of a signal of the frequency band $F'_1$. The output signals from the filters 34Ba and 34Bb are combined by a combiner 33B. The thus combined electric signal is converted by an E/O converter 32B into an optical signal of an optical wavelength $\lambda_i$. The optical signal is provided via an optical multiplexer 31B to an optical fiber 20B.

In a divider/combiner unit 100B the optical signal from the optical fiber 20B is composed of optical signals of optical wavelengths $\lambda_1$ to $\lambda_N$. These optical signals are demultiplexed by an optical demultiplexer 14B. The optical signals are converted by O/E converters 13B-1 to 13B-N into electric signals. The electric signals are each divided by one of dividers 12B-1 to 12B-N into two signals. The one output signal from each of the dividers 12B-1 to 12B-N is provided to a combiner 11B, by which the output signals are combined into one electric signal. The up-link RF signal $S'_0$ is extracted from the thus combined signal by a filter 19B-0 that permits the passage therethrough of a signal of the frequency band $F'_0$ alone. The up-link RF signals $S'_{11}$ to $S'_{1N}$ of the frequency band $F'_1$ are extracted from the other output signals from the dividers 12B-1 to 12B-N by filters 19B-1 to 19B-N that permit the passage therethrough of signals of only the frequency band $F'_1$.

In the divider/combiner unit 100B the output signal $S'_{1i}$ from the filter 19B-i becomes an up-link RF signal from the i-th radio access unit 30B-i. When cells of adjacent radio access units are designed to partly overlap, a transmission signal from a radio terminal in the overlapping area is received by radio access units in the both cells. In this instance, there is the possibility that the antenna 36Bb of the i-th radio access unit receives the signal $S'_{1i}$ and, at the same time, receives a signal, for example, $S'_{1i+1}$ (In this instance, the two signals differ in frequency since the radio terminals having sent them belong to different cells; that is, $f'_{1i} \neq f'_{1i+1}$). Usually, the two RF signals cannot be separated by the RF-band filters 34Bb and 19B-i, and consequently, the signals $S'_{1i}$ and $S'_{1i+1}$ are both output from the filter 19B-i in the divider/combiner unit 100B. When the desired signal in this output is only the up-link RF signal from the radio terminal to which the cell itself of the i-th radio access unit belongs, the signal $S'_{1i+1}$ is unnecessary. In general, the frequency band of the RF signal output from the filter 19B-i is converted to the base band when it is demodulated. In the base band the signals $S'_{1i}$ and $S'_{1i+1}$ can easily be separated. Accordingly, the signal $S'_{1i+1}$ in the output from the filter 19B-i does not matter.

In the optical fiber transmission system described above with reference to FIGS. 6 and 7, the single-cell structure using the frequency band $F_0$ of the signal $S_0$ and the multi-cell structure using the frequency bands $f_{11}$ to $f_{1N}$ of the signals $S_{11}$ to $S_{1N}$ each form one system, but they can easily be extended to multiple systems. That is, down-link RF signals of all single-cell radio systems are combined with the down-link signal in FIG. 6, and the combined signal is input to the divider 11A. Further, down-link RF signals of plural multi-cell radio systems are combined with signals to be sent to the same radio access units, and the combined signals are input to the multiplexers 12A-1 to 12A-N. On the other hand, in each radio access unit the dividing number of the divider 33A is set equal to the number of radio systems, and the respective output signals from the divider 33A are filtered and amplified, thereafter being sent to respective transmitting antennas.

Similarly, in each radio access unit in FIG. 7, antennas are provided for receiving up-link RF signals of plural radio systems, and their received signals are amplified and filtered, thereafter being combined. In the base unit, the output signal from the combiner 11B is divided into the same number as that of the single-cell radio systems, and the divided outputs are applied to proper filters to extract up-link RF signals of the respective radio systems. Further, the output from each of the filters 19B-1 to 19B-N is divided into the same number as that of the multi-cell radio systems, and the respective divided outputs are applied to proper filters to extract up-link RF signals of the respective systems.

In the embodiment shown in FIGS. 6 and 7, the communication system, which contains the divider/combiner units 100A, 100B, the optical fibers 20A, 20B and the radio access units 30A-1 to 30A-N and 30B-1 to 30B-N, operates as a single-cell communication system with respect to the pair of terminals $X_0$ and $X'_0$. Further, this communication system is capable of operating as a multi-cell communication cell with respect to the sets of terminals $Y_1$ to $Y_N$ and $Y'_1$, to $Y'_N$ as well. Hence, this communication system has high cost-performance for the utilization of hybrid systems.

In the embodiment of FIGS. 6 and 7, the terminals in the communication system of the present invention can be connected, as in the embodiments of FIGS. 3, 4 and 5, to the mobile communication network 70, via the mobile communication modem 17 connected to the terminals $X_0$ and $X'_0$ as indicated by the broken lines. Further, to construct a wireless LAN system according to the embodiment of FIGS. 6 and 7, N transmitters 16A and N receivers 16B connected to the wireless LAN repeater 15 in the embodiments FIGS. 3, 4 and 5 are provided, the outputs of the N transmitters 16A are connected to the N input terminals $Y_1$, to $Y_N$ in FIG. 6, respectively, and the N output terminals $Y'_1$ to $Y'_N$ in FIG. 7 are connected to the inputs of the N receivers 16B, respectively. Moreover, the communication system can be adapted for connection to the IP network as in the case of FIG. 4, and it can also be adapted so that the wireless LAN system can be connected via the combiner/separator 102 by the use of the protocol converter 102 as shown in FIG. 5. These modifications are applicable as well to the embodiment described hereafter.

Figure 9:
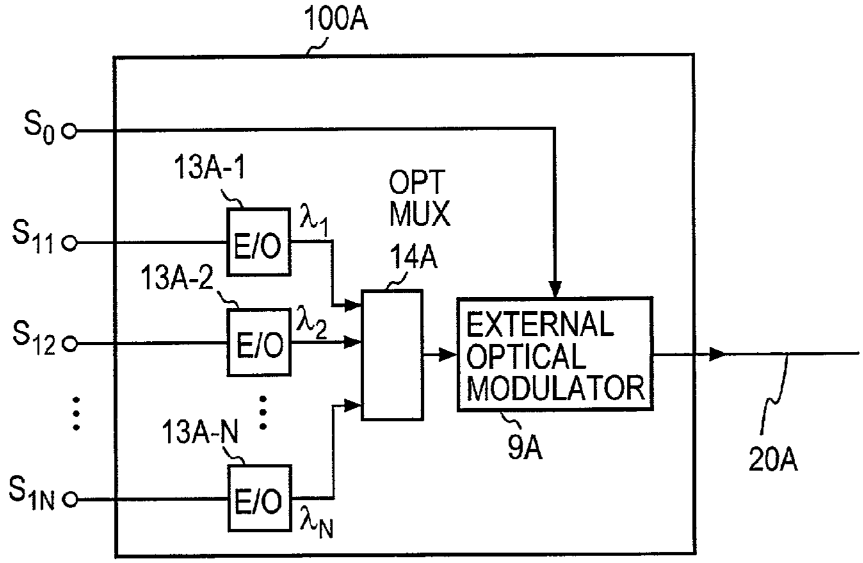
FIG. 9 is a block diagram illustrating an example of a divider/combiner unit.

FIG. 9 illustrates a modified form of the divider/combiner unit 100A used in the FIG. 6 embodiment. In the divider/combiner unit 100A the down-link RF signals $S_{11}, S_{12}, \ldots, S_{1N}$ of the multi-cell radio system are converted by the E/O converters 13A-1 to 13A-N into optical signals. The wavelength of the optical signal corresponding to the RF signal $S_{1i}$ is $\lambda_i$. These optical signals are multiplexed by the optical multiplexer 14A. The thus multiplexed optical signal is input to an external optical modulator 9A, wherein it is intensity modulated by the down-link RF signal $S_0$ of the single-cell radio system, and the intensity-modulated signal is provided on the optical fiber 20A. Since the optical signals of different optical wavelength are simultaneously intensity modulated by the RF signal $S_0$ in the external optical modulator 9A, information of the signal $S_0$ is modulated into the optical signals of all the wavelengths.

Figure 10:
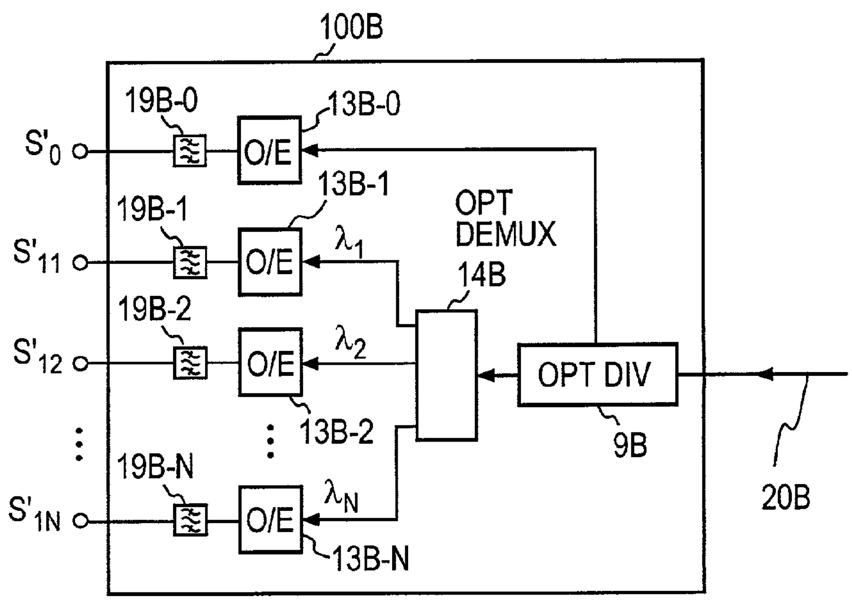
FIG. 10 is a block diagram illustrating another example of the divider/combiner unit.

FIG. 10 illustrates a modified form of the divider/combiner unit 100B in FIG. 7, which corresponds to the FIG. 9 modification.

The optical signal from the optical fiber 20B contains optical signals of different optical wavelengths sent from respective radio access units. In the divider/combiner unit 100B the optical signal is divided by an optical divider 9B into two optical signals. The one output from the optical divider 9B is converted by an O/E converter 13B-0 into an electric signal. The up-link RF signal $S'_0$ is extracted from the electric signal by the filter 19B-0 that permits the passage therethrough of a signal of the frequency band $F'_0$ alone. The other output from the optical divider 9B is demultiplexed by an optical demultiplexer 14B. The demultiplexed optical signals of the respective wavelengths are converted by the O/E converters 13B-1 to 13B-N into electric signals. From these electric signals are derived the up-link RF signals of the frequency band $F'_1$ by the filters 19B-1 to 19B-N that permits the passage therethrough of signals of the frequency band $F'_1$ alone. The output signal from the filter 19B-i becomes the up-link RF signal from the i-th radio access unit.

Figure 11:
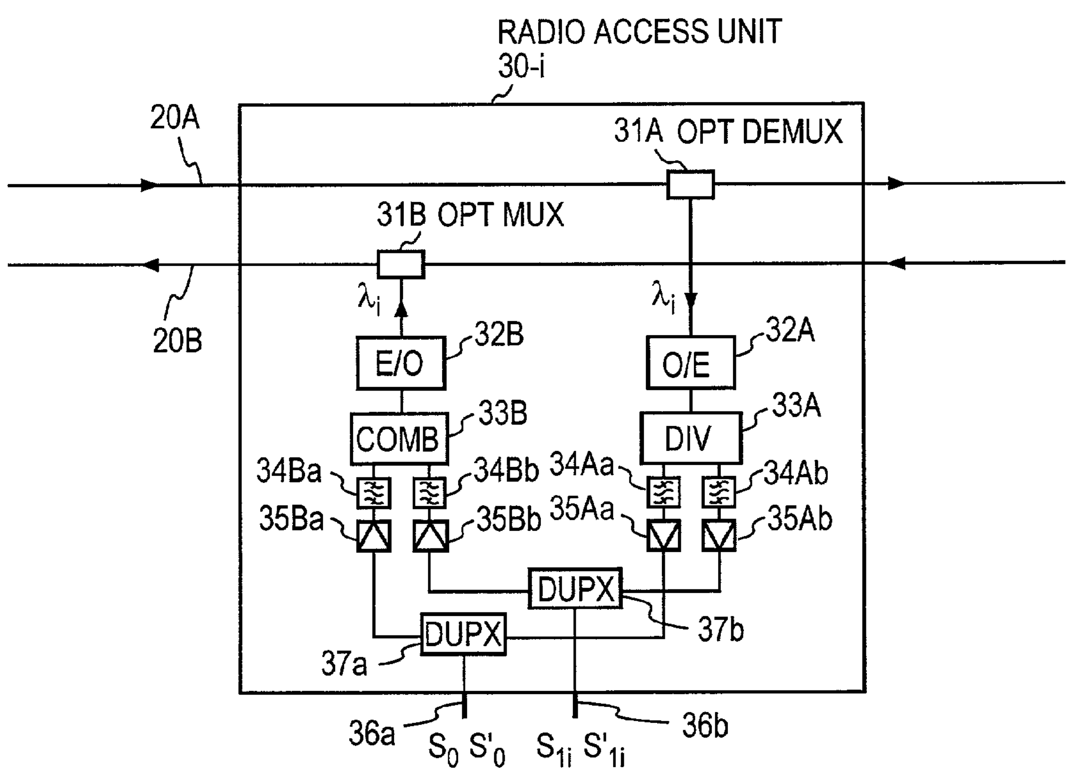
FIG. 11 is a block diagram illustrating still another example of the divider/combiner unit.

FIG. 11 illustrates another modified form of the divider/combiner units 100A and 100B in the embodiments of FIGS. 6 and 7.

In the down-link, in the radio access unit 30-i the optical signal from the down-link optical fiber 20A is input to the optical demultiplexer 31A inserted in the down-link optical fiber 20A, by which the optical signal of the wavelength $\lambda_i$ is extracted from the input optical signal. The optical signal of the wavelength $\lambda_i$ converted by the O/E converter 32A into an electric signal, which is divided by the divider 33A into two. The one output signal from the divider 33A is filtered by the filter 34Aa through which only signals of the frequency band $F_0$ are allowed to pass, and from which the RF signal $S_0$ is provided. The RF signal $F_0$ is amplified by the amplifier 35Aa, and then sent via a duplexer 37*a* to an antenna 36*a*, from which it is radiated out as a down-link RF signal into space. The other output signal from the divider 33A is filtered by the filter 34Ab that permits the passage therethrough of only signals of the frequency band $F_1$, and the signal $S_{1i}$ is output from the filter 34Ab. The signal $S_{1i}$ is amplified by the amplifier 35Ab and provided via a duplexer 37*b* to an antenna 36*b*, from which it is radiated out as an RF signal into space.

In the up-link, the radio access unit 30-i receives the signal $S'_0$ by an antenna 36*a* capable of RF signals of the frequency band $F'_0$ and the signal $F'_{1i}$ by an antenna 36*b* capable of receiving RF signals of the frequency band $F'_1$. The up-link RF signal $S'_0$ received by the antenna 36*a* is provided via the duplexer 37*a* to the amplifier 35Ba, by which it is amplified, and the amplified signal is filtered by the filter 34Ba that permits the passage therethrough of signals of the frequency band $F'_0$. The up-link RF signal $F'_{1i}$ received by the antenna 36*b* is provided via the duplexer 37*b* to the amplifier 35Bb, by which it is amplified, and the amplified signal is filtered by the filter 34Bb that permits the passage therethrough of only signals of the frequency band $F'_1$. The output signals from the filters 34Ba and 34Bb are combined by the combiner 33B. The thus combined electric signal is converted by the E/O converter 32B into an optical signal of the optical wavelength $\lambda_i$. The optical signal is provided via the optical multiplexer 31B to the up-link optical fiber 20B.

Embodiment 5

Figure 12:
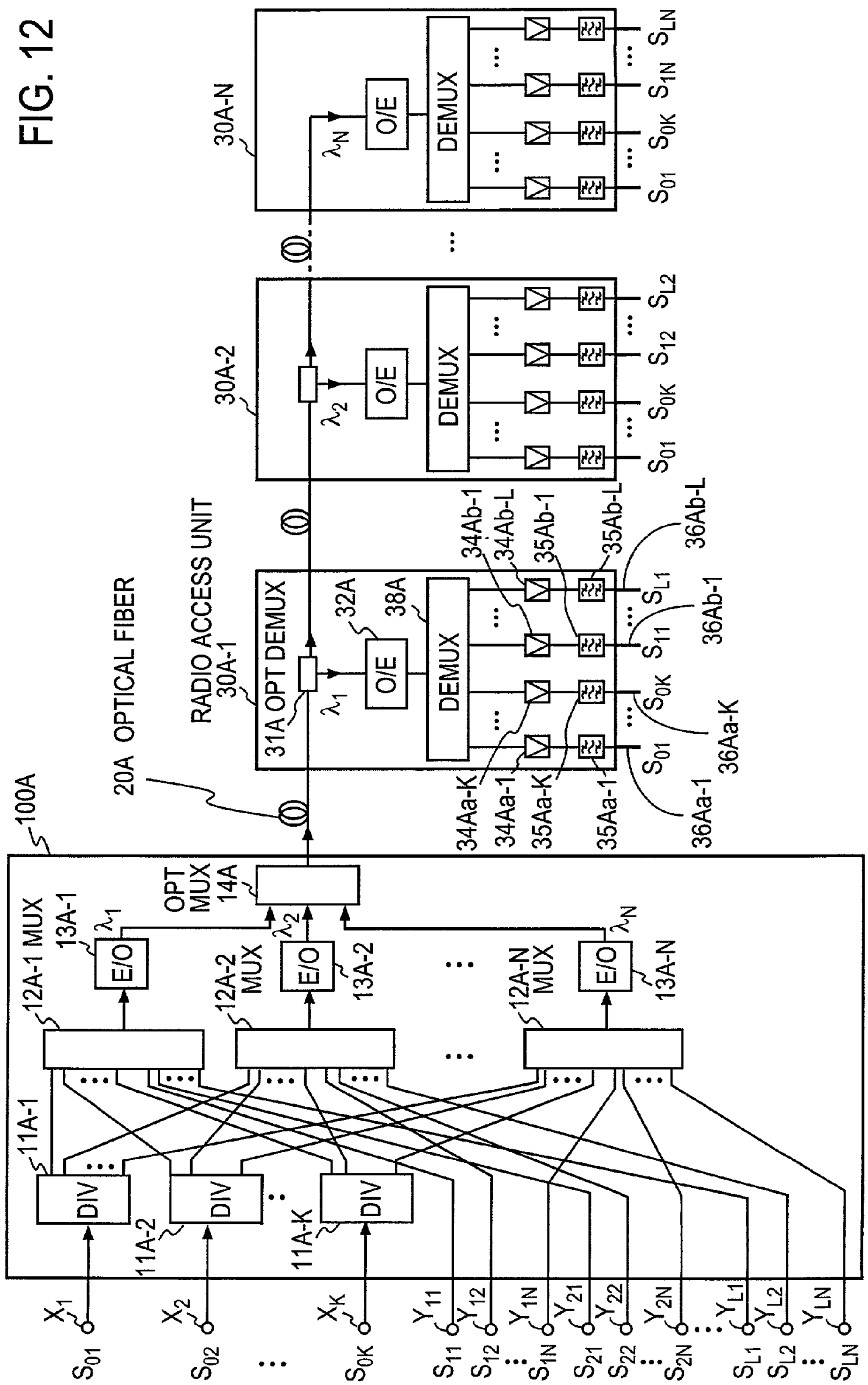
FIG. 12 is a block diagram showing the system configuration for the down-link signal in a communication system adapted to be used as a plurality of single-cell communication systems and a plurality of multi-cell communication systems.
Figure 13:
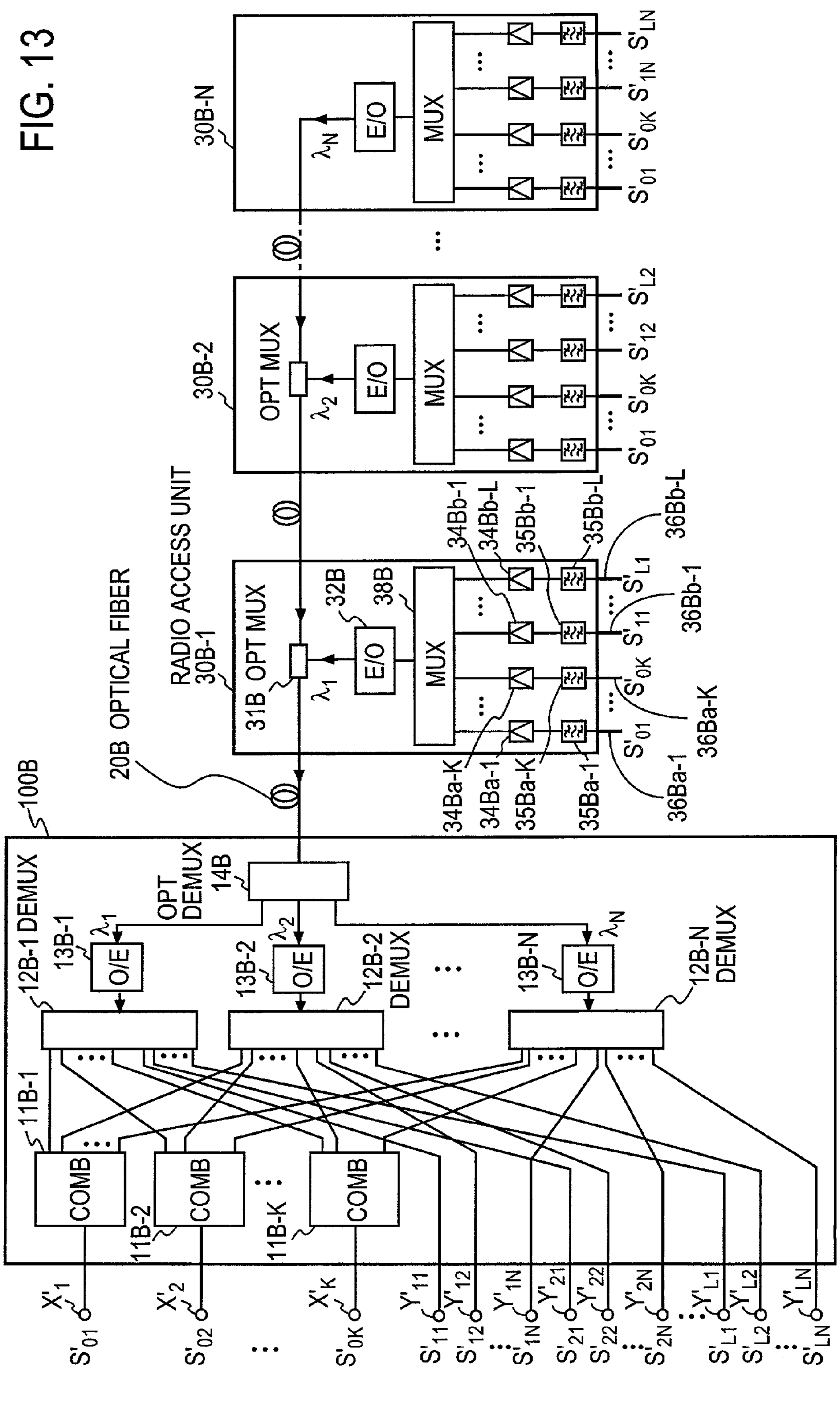
FIG. 13 is a block diagram showing the system configuration for the up-link signal in the communication system of FIG. 12.

FIGS. 12 and 13 illustrate in block form a fifth embodiment of the present invention. With a view to further increasing its cost-performance the communication system of this embodiment is adapted to be usable as plural independent multi-cell systems and plural independent single-cell systems.

FIG. 12 depicts plural single-cell radio systems and plural multi-cell radio systems for down-link signals. In FIG. 12, signals $S_{01}, S_{02}, \ldots, S_{0K}$ are down-link RF signals of K (where K is an integer equal to or greater than 1) single-cell radio systems, respectively. The RF signals are ultimately provided to all the radio access units 30A-1 to 30A-N, for which they are transmitted as RF signals. The frequency bands of the RF signals $S_{01}, S_{02}, \ldots, S_{0K}$ will be identified by $F_{A\text{-}1}, F_{A\text{-}2}, \ldots, F_{A\text{-}K}$, respectively. The frequency bands $F_{A\text{-}1}, F_{A\text{-}2}, \ldots, F_{A\text{-}K}$, are sufficiently spaced apart. Signals $\{S_{11}, S_{12}, \ldots, S_{1N}\}, \{S_{21}, S_{22}, \ldots, S_{2N}\}, \ldots, \{S_{L1}, S_{L2}, \ldots, S_{LN}\}$ are down-link RF signal sequences of L (where L is an integer equal to or greater than 1) multi-cell radio systems. The RF signal sequences each contain N (where N is an integer equal to or greater than 1) signals.

The signal $S_{ji}$ (where j=1, 2, . . . , L and i=1, 2, . . . , N) is a signal that is sent only to an i-th radio access unit 30A-i of a j-th multi-cell radio system. This signal is ultimately transmitted as an RF signal from the radio access unit 30A-i. The frequency bands of the RF signal sequences will be identified by $F_{B\text{-}1}, F_{B\text{-}2}, \ldots, F_{B\text{-}L}$, and the frequency bands are sufficiently spaced apart and also sufficiently spaced apart from the frequency bands $F_{A\text{-}1}, F_{A\text{-}2}, \ldots, F_{A\text{-}K}$. Letting the frequency band of the signal $S_{ji}$ be represented by $F_{j\text{-}i}$, the frequency bands $F_{j\text{-}1}, F_{j\text{-}2}, \ldots, F_{j\text{-}N}$ are included in the frequency band $F_{B\text{-}j}$; these frequency bands will hereinafter be referred to as plural frequency channels belonging to the frequency band $F_{B\text{-}j}$. The frequency bands $F_{j\text{-}1}, F_{j\text{-}2}, \ldots, F_{j\text{-}N}$ are arranged adjacently within the frequency band $F_{B\text{-}j}$.

This embodiment uses K dividers 11A-1 to 11A-K each identical with that in FIG. 6. N divided outputs from each divider 11A are input to the N multiplexers 12A-1 to 12A-N. L groups of multi-cell input terminals are provided; each group is identical with that in FIG. 6. N terminals of each group are connected to the N multiplexers 12A-1 to 12A-N, respectively. That is, the divider/combiner unit 100A comprises K dividers 11A-1 to 11A-N, the N multiplexers 12A-1 to 12A-N, the N E/O converters 13A-1 to 13A-N, and the optical multiplexer 14A. Each combiner 12A-i (where i=1, 2, . . . , N) multiplexes (K+L) RF signals of the frequency bands $F_{A\text{-}1}, F_{A\text{-}2}, \ldots, F_{A\text{-}K}$ and $F_{B\text{-}1}, F_{B\text{-}2}, \ldots, F_{B\text{-}L}$, and provides the multiplexed signal to the E/O converter 13A-i.

Each radio access unit 30A-i (where i=1, 2, . . . , N) comprises the optical demultiplexer 31A, the O/E converter 32A, the demultiplexer 38A, (K+L) amplifiers 34Aa-1 to 34Aa-K and 34Ab-1 to 34Ab-L, (K+L) filters 35Aa-1 to 35Aa-K and 35Ab-1 to 35Ab-L, and (K+L) antennas 36Aa-1 to 36Aa-K and 36Ab-1 to 36Ab-L.

In the divider/combiner unit 100A, the input RF signal $S_{0m}$ (where m=1, 2, . . . , K) is divided by the divider 11A-m into N signals. The first to N-th outputs of the divider 11A-m are connected to m-th input ports of the N multiplexers 12A-1 to 12A-N. On the other hand, each RF signal $S_{ji}$ (where i=1, 2, . . . , N) in the RF signal sequence $\{S_{j1}, S_{j2}, \ldots, S_{jN}\}$ (where j=1, 2, . . . , L) is connected to a (K+j)-th input port of the i-th multiplexer 12A-i. The output electric signals from the multiplexers 12A-1 to 12A-N are converted by the E/O converters 13A-1 to 13A-N into optical signals of different wavelengths $\lambda_1, \lambda_2, \ldots, \lambda_N$. The N optical signals from the E/O converters 13A-1 to 13A-N are multiplexed by the optical multiplexer 14A, from which the multiplexed output is provided on the optical fiber 20A.

In the radio access unit 30A-i (where i=1, 2, . . . , N) the optical demultiplexer 31A connected to the optical fiber 20A extracts the optical signal of the wavelength $\lambda_i$. The optical signals of the other remaining wavelength pass through the optical demultiplexer 31A and propagate to the next radio access unit 30A-(i+1). The optical signal of the wavelength $\lambda_I$ is converted by the O/E converter 32A into an electric signal. The electric signal is demultiplexed by the demultiplexer 38A to signals $S_{01}, S_{02}, \ldots, S_{0K}$ and $S_{1i}, S_{2i}, \ldots, S_{Li}$. The RF signals $S_{01}, S_{02}, \ldots, S_{0K}$ are amplified by the amplifiers 34Aa-1 to 34Aa-K, and filtered by the band-pass filters 35Aa-1 to 35Aa-K, thereafter being radiated out as RF signals into space from the antennas 36Aa-1 to 36Aa-K. The signals $S_{1i}, S_{2i}, \ldots, S_{Li}$ are amplified by the amplifiers 34Ab-1 to 34Ab-L and filtered by the band-pass filters 35Ab-1 to 35Ab-L, thereafter being radiated out as RF signals into space from the antennas 36Ab-1 to 36Ab-L.

FIG. 13 illustrates an example of a radio system for up-link signals corresponding to the FIG. 12 system for down-link signals. In FIG. 13, signals $S'_{01}, S'_{02}, \ldots, S'_{0K}$ are up-link RF signals of K (where K is an integer equal to or greater than 1) single-cell radio systems, respectively. The RF signals are sent from radio terminals of the single-cell radio systems. The frequency bands of the RF signals $S'_{01}, S'_{02}, \ldots, S'_{0K}$ will be identified by $F'_{A-1}, F'_{A-2}, \ldots, F'_{A-K}$, respectively. The frequency bands $F'_{A-1}, F'_{A-2}, \ldots, F'_{A-K}$ are sufficiently spaced apart. Signals $\{S'_{11}, S'_{12}, \ldots, S'_{1N}\}$, $\{S'_{21}, S'_{22}, \ldots, S'_{2N}\}, \ldots, \{S'_{L1}, S'_{L2}, \ldots, S'_{LN}\}$ are up-link RF signal sequences of L (where L is an integer equal to or greater than 1) multi-cell radio systems. The RF signal sequences each contain N (where N is an integer equal to or greater than 1) signals.

The signal $S'_{ji}$ (where j=1, 2, . . . , L and i=1, 2, . . . , N) is sent from that radio terminal of a j-th multi-cell radio system which is disposed near an i-th radio access unit 30B-i of the radio system. The frequency bands of the RF signal sequences will be identified by $F'_{B-1}, F'_{B-2}, \ldots, F'_{B-L}$, and the frequency bands are sufficiently spaced apart and also sufficiently spaced apart from the frequency bands $F'_{A-1}, F'_{A-2}, \ldots, F'_{A-K}$. Letting the frequency band of the signal $S'_{ji}$ be represented by $F'_{j-i}$, the frequency bands $F'_{j-1}, F'_{j-2}, \ldots, F'_{j-N}$ are included in the frequency band $F'_{B-j}$; these frequency bands will hereinafter be referred to as plural frequency channels belonging to the frequency band $F'_{B-j}$. The frequency bands $F'_{j-1}, F'_{J-2}, \ldots, F'_{J-N}$ are arranged adjacently within the frequency band $F'_{B-j}$.

The divider/combiner unit 100B comprises K combiners 11B-1 to 11B-K, N demultiplexers 12B-a to 12B-N, N O/E converters 13B-1 to 13B-N and the optical demultiplexer 14B. An i-th demultiplexer 12B-i (I=1, 2, . . . , N) demultiplexes its input signal to (K+L) RF signals of the frequency bands $F'_{A-1}, F'_{A-2}, \ldots, F'_{A-K}$ and $F'_{B-1}, F'_{B-2}, \ldots, F'_{B-L}$, and provides the RF signals $F'_{A-1}, F'_{A-2}, \ldots, F'_{A-K}$ to I-th ports of the K combiners 11B-1 to 11B-K and the RF signals $F'_{B-1}, F'_{B-2}, \ldots, F'_{B-L}$ to L terminals $Y'_{1i}, Y'_{2i}, \ldots, Y'_{Li}$. Each combiner 11B-m (where m=1, 2, . . . , K) is supplied with signals from m-th output ports of the N demultiplexers 12B-1 to 12B-N, and combines them and provides the combined output to a terminal $X'_m$.

Each radio access unit 30B-i (where i=1, 2, . . . , N) comprises the optical multiplexer 31B, the E/O converter 32B, the multiplexer 38B, (K+L) amplifiers 34Ba-1 to 34Ba-K and 34Bb-1 to 34Bb-L, (K+L) band-pass filters 35Ba-1 to 35Ba-K and 35Bb-1 to 35Bb-L, and (K+L) antennas 36Ba-1 to 36Ba-K and 36Bb-1 to 36Bb-L. The multiplexer 38B multiplexes (K+L) RF signals of the frequency bands $F'_{A-1}, F'_{A-2}, \ldots, F'_{A-K}$ and $F'_{B-1}, F'_{B-2}, \ldots, F'_{B-L}$.

In each radio access unit 30B-i (where i=1, 2, . . , N), the antennas 36ba-1 to 36Ba-K and 36Bb-1 to 36BBb-L, whose receiving frequency bands are $F'_{A-1}, F'_{A-2}, \ldots, F'_{A-K}$ and $F'_{B-1}, F'_{B-2}, \ldots, F'_{B-L}$, receive the RF signals $S'_{01}, S'_{02}, \ldots, S'_{0K}$ and $S'_{1i}, S'_{2i}, \ldots, S'_{Li}$. These filters 35Ba-1 to 35Ba-K and 35Bb-1 to 35Bb-L, and amplified by the amplifiers 34Ba-1 to 34Ba-K and 34Bb-1 to 34Bb-L. The amplified signals are multiplexed by the multiplexer 38B into one electric signal. The thus multiplexed electric signal is converted by the E/O converter 32B into an optical signal of the wavelength $\lambda_i$. The optical signal is provided via the optical multiplexer 31B to the optical fiber 20B.

In the divider/combiner unit 100B, the optical signal from the optical fiber 20B is demultiplexed by the optical demultiplexer 14B into optical signals of the wavelengths $\lambda_1$ to $\lambda_N$. Of these optical signals, the optical signal of the wavelength $\lambda_i$ (where i=1, 2, . . . , N) is converted by the O/E converter 13B-i into an electric signal, which is demultiplexed by the demultiplexer 12B-i into signals of respective frequency bands. Since the optical signal of the wavelength $\lambda_1$ sent from the corresponding radio access unit 30B-i, the (K+L) output signals from the corresponding demultiplexer 12Bi are the RF signals $S'_{01}, S'_{02}, \ldots, S'_{0K}$ and $S'1_i, S'_{2i}, \ldots, S'_{Li}$. The demultiplexer 12B-i sequentially outputs the signals $S'_{01}$ to $S'_{0K}$ from its first to K-th output ports and the signals $S'_{1i}$ to $S'_{Li}$ from its (K+1)th to (K+L)-th output ports.

The N output signals from the m-th (where m=1, 2, . . . , K) output ports of the demultiplexer 12B-1 to 12B-N are combined by the combiner 11B-m into one electric signal. This electric signal becomes a composite signal of up-link RF signals $S'_m$ from all the radio access units 30B-1 to 30B-N. On the other hand, by collecting N output signals from j-th (where j=K+1, K+2, K+L) output ports of the demultiplexer 12B-1 to 12B-N, N up-link RF signals $S'_{(j-K),1}, S'_{(j-K),2}, \ldots, S'_{(j-K),N}$ of a (j−K)-th multi-cell radio system can be obtained.

As described above, according to the embodiments of FIGS. 12 and 13, the communication system, comprised of the divider/combiner units 100A, 100B, the down- and up-link optical fibers 20A and 20B, and the N radio access units, operates K-fold as K single-cell communication systems with respect to the corresponding sets of terminals $X_1, \ldots, X_K$ and $X'_1, \ldots, X'_K$, and the same communication system is capable of operating L-fold as L multi-cell communication systems with respect to the sets of terminals $Y_{11}, \ldots, Y_{LN}$ and $Y'_{11}, \ldots, Y'_{LN}$. Hence, the communication system of this embodiment achieves very high cost-performance for utilization of the hybrid systems.

Embodiment 6

Figure 14:
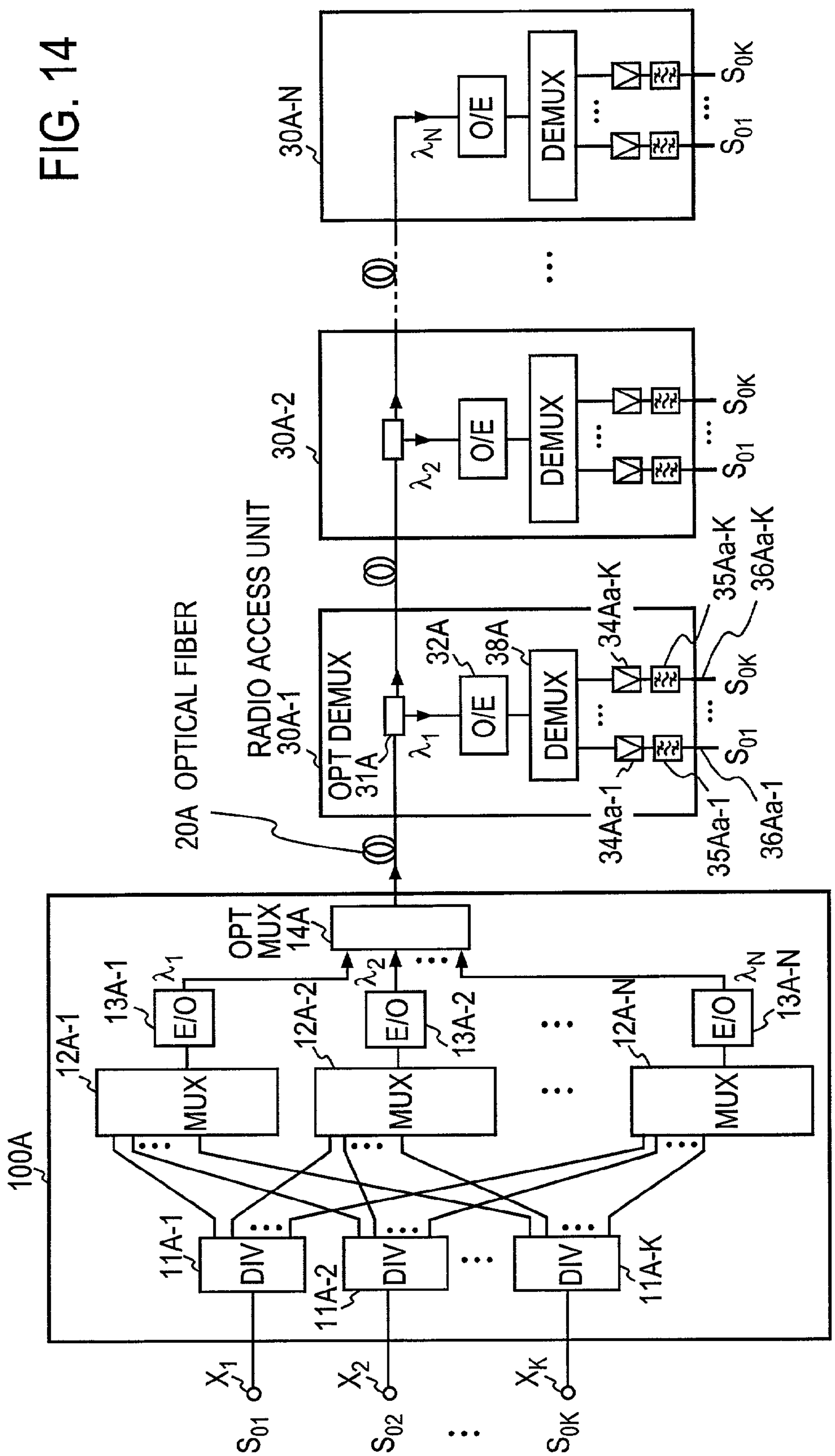
FIG. 14 is a block diagram showing the system configuration for the down-link signal in a communication system adapted to be used as a plurality of single-cell communication systems.
Figure 15:
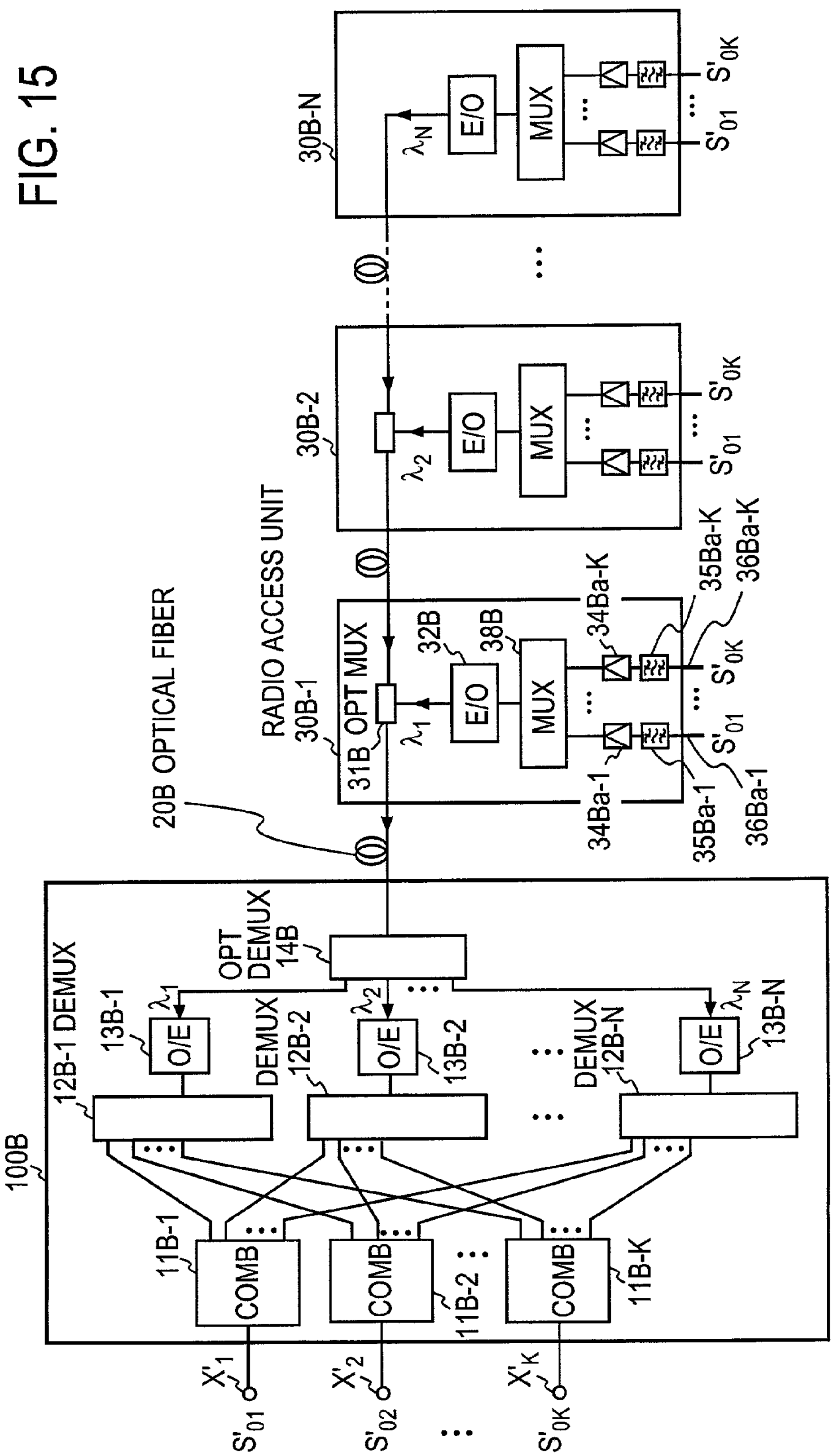
FIG. 15 is a block diagram showing the system configuration for the up-link signal in the communication system of FIG. 14.

FIGS. 14 and 15 illustrate a sixth embodiment of the present invention. FIG. 14 shows the case where the number L of multi-cell radio systems in FIG. 12 is reduced to zero. In FIG. 14, the process of transmitting down-link RF signals of K (where K is an integer equal to or greater than 1) single-cell radio systems is the same as the process of transmission of the down-link RF signals of the K single-cell radio systems in FIG. 12.

FIG. 15 shows the case where the number L of multi-cell radio systems in FIG. 13 is reduced to zero. In FIG. 15, the process of transmitting up-link RF signals of K (where K is an integer equal to or greater than 1) single-cell radio systems is the same as the process of transmission of the up-link RF signals of the K single-cell radio systems in FIG. 13.

In the embodiments of FIGS. 14 and 15, the communication system, comprised of the divider/comber units 100A, 100B, the down- and up-link optical fibers 20A and 20B and the N radio access units, is capable of operating K-fold as K single-cell communication systems with respect to the corresponding sets of terminals $X_1, \ldots, X_K$ and $X'_1, \ldots, X'_K$. Hence, the communication system of this embodiment achieves very high cost-performance for utilization of the hybrid systems.

Embodiment 7

Figure 16:
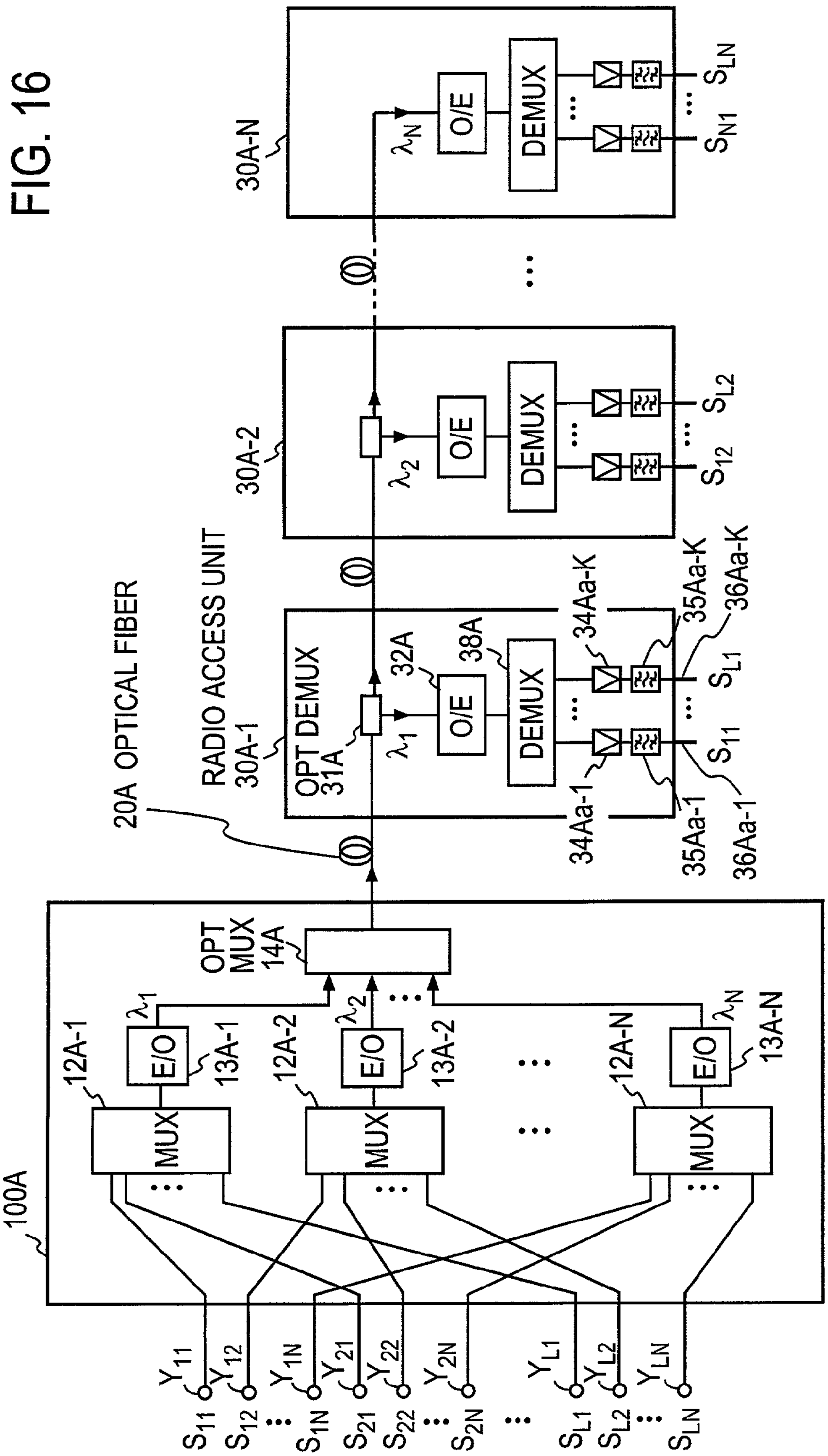
FIG. 16 is a block diagram showing the system configuration for the down-link signal in a communication system adapted to be used as a plurality of multi-cell communication systems.
Figure 17:
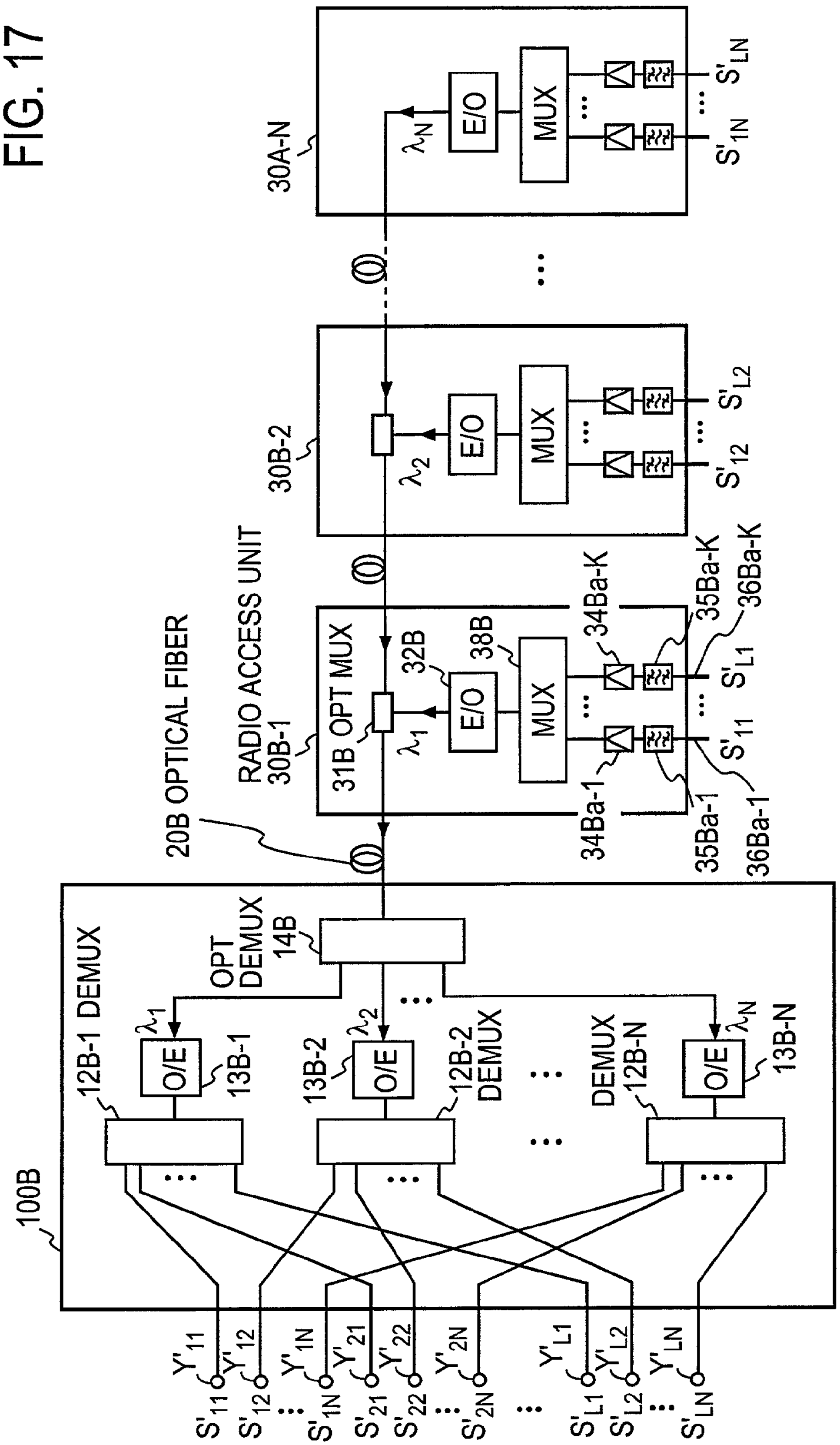
FIG. 17 is a block diagram showing the system configuration for the up-link signal in the communication system of FIG. 16.

FIGS. 16 and 17 illustrate a seventh embodiment of the present invention. FIG. 16 shows the case where the number K of single-cell radio systems in FIG. 12 is reduced to zero. In FIG. 16, the process of transmitting down-link RF signal sequences of L (where L is an integer equal to or greater than 1) multi-cell radio systems is the same as the process of transmission of the down-link RF signal sequences of the L multi-cell radio systems in FIG. 12.

FIG. 17 shows the case where the number K of single-cell radio systems in FIG. 13 is reduced to zero. In FIG. 17, the process of transmitting up-link RF signal sequence of L (where L is an integer equal to or greater than 1) multi-cell radio systems is the same as the process of transmission of the up-link RF signal sequences of the L multi-cell radio systems in FIG. 13.

In the embodiments of FIGS. 14 and 15, too, the communication system, comprised of the divider/comber units 100A, 100B, the down- and up-link optical fibers 20A and 20B and the N radio access units, is capable of operating L-fold as L multi-cell communication systems with respect to the corresponding sets of terminals $Y_{11}, \ldots, Y_{LN}$ and $Y'_{11}, \ldots, Y'_{LN}$. Hence, the communication system of this embodiment achieves very high cost-performance for utilization of the hybrid systems.

Effect of the Invention

As described above, according to the present invention, the same system, which comprises a divider/combiner unit, down- and up-link optical fibers and N radio access units, can be operated as multiple communication systems corresponding to multiple input/output terminals. The communication system utilizes to connect multiple radio systems on the same optical fiber transmitting means. As a result, the system has higher cost-performance than the existing indoor radio communications systems such as a wirelss LAN, and a mobile communication system.

For example, the use of a wireless LAN system and a mobile communication system as the multiple communication systems enables mobile communication terminals and wireless LAN terminals to be used on the same communication system.

By setting different optical wavelengths between the divider/combiner unit and each radio access unit, N independent RF signal transmission lines are formed apparently between the divider/combiner unit and each radio access unit. Consequently, RF signals of multiple-cell systems are transmitted over the respective transmission lines, and the RF signals of the single-cell systems are simultaneously transmitted over all of the transmission lines. This enable single-cell radio systems and multi-cell radio systems to be accommodated in one optical fiber transmission system, hence providing increased utilization cost-performance of the transmission system.

Alternatively, plural RF signals are divided/combined corresponding to plural input/output terminals, and they are transmitted as optical signals of different wavelengths between the divider/combiner unit and N radio access units, by which the communication system can be used as a single-cell system and/or multi-cell system; therefore, the utilization cost-performance of the communication system can be increased.

What is claimed is:

1. A communication system using optical fibers, said communication system comprising:

down- and up-link optical fibers;

N radio access units, each of which has antenna means, connected to said down- and up-link optical fibers converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively: converts a down-link RF signal input to each of said input/output terminals into an optical signal, and sends the converted optical signal as said down-link optical signal via said down-link optical fiber to those of said radio access units corresponding said first and second communication systems: and converts said up-link optical signal, sent over said up-link optical fiber from said radio access units corresponding to said first and second communication systems, into an up-link RF signal and providing an up-link RF signal input to each of said input/output terminal corresponding said first and second communication systems; and said first and second communication systems which are: a single-cell communication system for causing said N radio access units to function as a single cell corresponding to one of said plurality of input/output terminals; and a multi-cell communication system for causing said N radio access units to function as N multiple cells corresponding to the remaining N of said plurality of input/output terminals, wherein said single-cell communication system not being part of a multi-cell communication system.

2. A communication system using, optical fibers, said communication system comprising:

down- and up-link optical fibers;

N radio access units, each of which has antenna means, connected to said down- and up-link optical fibers converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively: converts a down-link RF signal input to each of said input/output terminals into an optical signal, and sends the converted optical signal as said down-link optical signal via said down-link optical fiber to those of said radio access units corresponding said first and second communication systems: and converts said up-link optical signal, sent over said up-link optical fiber from said radio access units corresponding to said first and second communication systems, into an up-link RF signal and providing an up-link RF signal input to each of said input/output terminal corresponding said first and second communication systems; and said first and second communication systems which are: a single-cell communication system for causing said N radio access units to function as a single cell corresponding to one of said plurality of input/output terminals: and a multi-cell communication system for causing said N radio access units to function as N multiple cells corresponding to the remaining N of said plurality of input/output terminals, said divider/combiner units comprises: a down-link divider for dividing an RF signal of a first down-link frequency band, provided to one input terminal of said plurality of input/output terminal, into N signals; N down-link multiplexers each for multiplexing different one of said N signals from said down-link divider with corresponding one of RF signals provided to remaining N input terminals of said N input/output terminals, adjacent ones of said RF signals having different frequencies in a second down-link frequency band different from said first down-link frequency band; N electro/optic converters for converting the outputs from said N down-link multiplexers into optical signals of different wavelengths; and a down-link optical multiplexer for multiplexing said optical signals from said N down-link electro/optic converters and providing the multiplexed output as said down-link optical signal to said downlink optical fiber; and said N radio access units each comprising: a down-link optical demultiplexer for extracting a down-link optical signal of one of said different wavelengths from said down-link optical signal on said down-link optical fiber; a down-link opto/electric converter for converting said extracted optical signal into an electric RF signal; a first down-link filter for extracting said RF signal of said first down-link frequency band from said electric RF signal and providing said extracted RF signal to said antenna means; and a second down-link filter for extracting said RF signal of said second down-link frequency band from said electric RF signal and providing said extracted RF signal to said antenna means.

3. A communication system using optical fibers, said communication system comprising:

down- and up-link optical fibers;

N radio access units, each of which has antenna means, connected to said down- and up-link optical fibers, converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively; converts a down-link RF signal input to each of said input/output terminals into an optical signal, and sends the converted optical signal as said down-link optical signal via said down-link optical fiber to those of said radio access units corresponding said first and second communication systems; and converts said up-link optical signal, sent over said up-link optical fiber from said radio access units corresponding to said first and second communication systems, into an up-link RF signal, and providing an up-link RF signal input to each of said input/output terminal corresponding said first and second communication systems:

said divider/combiner units comprises: a down-link divider for dividing an RF signal of a first down-link frequency band, provided to one input terminal of said plurality of input/output terminal, into N signals; N down-link multiplexers each for multiplexing different one of said N signals from said down-link divider with corresponding one of RF signals provided to remaining N input terminals of said N input/output terminals, adjacent ones of said RF signals having different frequencies in a second down-link frequency band different from said first down-link frequency band; N electro/optic converters for converting the outputs from said N down-link multiplexers into optical signals of different wavelengths; and a down-link optical multiplexer for multiplexing said optical signals from said N down-link electro/optic converters and providing the multiplexed output as said down-link optical signal to said down-link optical fiber; and said N radio access units each comprising: a down-link optical demultiplexer for extracting a down-link optical signal of one of said different wavelengths from said down-link optical signal on said down-link optical fiber; a down-link opto/electric converter for converting said extracted optical signal into an electric RF signal; a first down-link filter for extracting said RF signal of said first down-link frequency band from said electric RF signal and providing said extracted RF signal to said antenna means; and a second down-link filter for extracting said RF signal of said second down-link frequency band from said electric RF signal and providing said extracted RF signal to said antenna means.

4. The communication system of claim 2 or 3, wherein: said N radio access unit each comprises: a first up-link third filter for extracting an RF signal of a first up-link frequency band from a received signal of said antenna means; a second up-link fourth filter for extracting an RF signal of a second up-link frequency band different from said first up-link frequency band from said received signal of said antenna means; an up-link combiner for combining said RF signals from said first and second up-link filters; an up-link electro/optic converter for converting the output from said up-link combiner into an optical signal of a different wavelength; and an up-link optical multiplexer for providing said converted optical signal as said up-link optical signal to said up-link optical fiber; and said divider/combiner unit comprises: an up-link optical demultiplexer for demultiplexing said optical signal from said up-link optical fiber into N optical signals of different wavelengths; N up-link opto/electric converters for converting said N optical signals of different wavelengths into electric RF signals; N up-link dividers each for dividing one of said electric RF signals from said N up-link opto/electric converters into two RF signals; and a second up-link combiner for combining one of said two output RF signals from each of said N up-link dividers and providing said combined RF signal to one output terminal of said plurality of input/output terminals, the other output RF signals from said N up-link dividers being provided to the remaining N output terminals of said plurality of input/output terminals.

5. The communication system of claim 2 or 3, wherein: said N radio access unit each comprises: a first up-link filter for extracting a first up-link RF signal of a first up-link frequency band from a received signal of said antenna means; a second up-link filter for extracting a second up-link RF signal of a second up-link frequency band different from said first up-link frequency band from said received signal of said antenna means; an up-link combiner for combining said first and second up-link RF signals from said first and second up-link filters; an up-link electro/optic converter for converting the output from said up-link combiner into an optical signal of a different wavelength; and an up-link optical multiplexer for providing said converted optical signal as said up-link optical signal to said up-link optical fiber; and said divider/combiner unit comprises: an up-link optical divider for dividing said optical signal from said up-link optical fiber into two optical signals; a first up-link opto/electric converter for converting one of said two optical signals from said up-link optical divider into a first up-link electric signal; a third up-link filter for extracting said first up-link RF signal of said first up-link frequency band from said first up-link electric signal converted by said first up-link opto/electric converter and providing said extracted first up-link RF signal to one of outputs of said input/output terminals; an up-link optical demultiplexer for demultiplexing the other optical signal divided by said optical divider into N optical signals of different wavelengths; N second up-link opto/electric converters for converting said N optical signals of different wavelengths into N second up-link electric RF signals; and N fourth up-link filters for extracting N second up-link RF signals of different frequencies in said second up-link frequency band from said second up-link electric signals converted by said N second up-link opto/electric converters and providing said N extracted second up-link RF signals to the other remaining N output terminals of said plurality of input/output terminals.

6. The communication system of claim 5, wherein: said antenna means of each of said radio access units has a first antenna for transmitting and receiving RF signals of said first up- and down-link frequency bands, and a second antenna for transmitting and receiving RF signals of said second up- and down-link frequency bands; and each of said radio access units has a first duplexer for providing said RF signal of said first up-link frequency band received by said first antenna to said first up-link filter and for providing the output RF signal from said first down-link filter to said first antenna, and a second duplexer for providing said RF signal of said second up-link frequency band received by said second antenna to said second up-link fourth filter and for providing the output RF signal from said second down-link filter to said second antenna.

7. A communication system using, optical fibers, said communication system comprising:

down- and up-link optical fibers;

N radio access units, each of which has antenna means, connected to said down- and up-link optical fibers converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively: converts a down-link RF signal input to each of said input/output terminals into an optical signal, and sends the converted optical signal as said down-link optical signal via said down-link optical fiber to those of said radio access units corresponding said first and second communication systems: and converts said up-link optical signal, sent over said up-link optical fiber from said radio access units corresponding to said first and second communication systems, into an up-link RF signal and providing an up-link RF signal input to each of said input/output terminal corresponding said first and second communication systems; and said first and second communication systems which are: a single-cell communication system for causing said N radio access units to function as a single cell corresponding to one of said plurality of input/output terminals: and a multi-cell communication system for causing said N radio access units to function as N multiple cells corresponding to the remaining N of said plurality of input/output terminals, said N radio access unit each comprises: a first up-link third filter for extracting an RF signal of a first up-link frequency band from a received signal of said antenna means; a second up-link fourth filter for extracting an RF signal of a second up-link frequency band different from said first up-link frequency band from said received signal of said antenna means; an up-link combiner for combining said RF signals from said first and second up-link filters; an up-link electro/optic converter for converting the output from said up-link combiner into an optical signal of a different wavelength; and an up-link optical multiplexer for providing said converted optical signal as said up-link optical signal to said up-link optical fiber; and said divider/combiner unit comprises: an up-link optical demultiplexer for demultiplexing said optical signal from said up-link optical fiber into N optical signals of different wavelengths; N up-link opto/electric converters for converting said N optical signals of different wavelengths into electric RF signals; N up-link dividers each for dividing one of said electric RF signals from said N up-link opto/electric converters into two RF signals; and a second up-link combiner for combining one of said two output RF signals from each of said N up-link dividers and providing said combined RF signal to one output terminal of said plurality of input/output terminals, the other output RF signals from said N up-link dividers being provided to the remaining N output terminals of said plurality of input/output terminals.

8. A communication system using optical fibers, said communication system comprising:

down- and up-link optical fibers;

N radio access units, each of which has antenna means, connected to said down- and up-link optical fibers, converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being, an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively; converts a down-link RF signal input to each of said input/output terminals into an optical signal, and sends the converted optical signal as said down-link optical signal via said down-link optical fiber to those of said radio access units corresponding said first and second communication systems; and converts said up-link optical signal, sent over said up-link optical fiber from said radio access units corresponding to said first and second communication systems, into an up-link RF signal, and providing an up-link RF signal input to each of said input/output terminal corresponding said first and second communication systems;

said N radio access unit each comprises: a first up-link third filter for extracting an RF signal of a first up-link frequency band from a received signal of said antenna means; a second up-link fourth filter for extracting an RF signal of a second up-link frequency band different from said first up-link frequency band from said received signal of said antenna means; an up-link combiner for combining said first and second up-link RF signals from said first and second up-link filters; an up-link electro/optic converter for converting the output from said up-link combiner into an optical signal of a different wavelength; and an up-link optical multiplexer for providing said converted optical signal as said up-link optical signal to said up-link optical fiber; and said divider/combiner unit comprises: an up-link optical divider for dividing said optical signal from said up-link optical fiber into two optical signals; a first up-link opto/electric converter for converting one of said two optical signals from said up-link optical divider into a first up-link electric signal; a third up-link filter for extracting said first up-link RF signal of said first up-link frequency band from said first up-link electric signal converted by said first up-link opto/electric converter and providing said extracted first up-link RF signal to one of outputs of said input/output terminals; an up-link optical demultiplexer for demultiplexing the other optical signal divided by said optical divider into N optical signals of different wavelengths; N second up-link opto/electric converters for converting said N optical signals of different wavelengths into N second up-link electric RF signals; and N fourth up-link filters for extracting N second up-link RF signals of different frequencies in said second up-link frequency band from said second up-link electric signals converted by said N second up-link opto/electric converters and providing said N extracted second up-link RF signals to the other remaining N output terminals of said plurality of input/output terminals.

9. The communication system of claim 7 or 8, wherein: said antenna means of each of said radio access units has a first antenna for transmitting and receiving RF signals of said first up- and down-link frequency bands, and a second antenna for transmitting and receiving RF signals of said second up- and down-link frequency bands; and each of said radio access units has a first duplexer for providing said RF signal of said first up-link frequency band received by said first antenna to said first up-link filter and for providing the output RF signal from said first down-link filter to said first antenna, and a second duplexer for providing said RF signal of said second up-link frequency band received by said second antenna to said second up-link fourth filter and for providing the output RF signal from said second down-link filter to said second antenna.

10. A communication system using, optical fibers, said communication system comprising:

down- and up-link optical fibers;

N radio access units, each of which has antenna means, connected to said down- and up-link optical fibers converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively: converts a down-link RF signal input to each of said input/output terminals into an optical signal, and sends the converted optical signal as said down-link optical signal via said down-link optical fiber to those of said radio access units corresponding said first and second communication systems: and converts said up-link optical signal, sent over said up-link optical fiber from said radio access units corresponding to said first and second communication systems, into an up-link RF signal and providing an up-link RF signal input to each of said input/output terminal corresponding said first and second communication systems; and said first and second communication systems which are: a single-cell communication system for causing said N radio access units to function as a single cell corresponding to one of said plurality of input/output terminals: and a multi-cell communication system for causing said N radio access units to function as N multiple cells corresponding to the remaining N of said plurality of input/output terminals, said divider/combiner unit receives a radio RF signal of a first down-link frequency band at one of input terminals of said plurality of input/output terminals and N radio RF signals of a second down-link frequency band different from said first down-link frequency band at the other N input terminals of said plurality of input/output terminals; said divider/combiner unit comprises: N down-link electro/optic converters for converting said N radio RF signals of said second down-link frequency band into optical signals of different wavelengths; a down-link optical multiplexer for multiplexing said optical signals from said N down-link electro/optic converters; and an external optical modulator for externally modulating the multiplexed optical signal from said down-link optical multiplexer by said radio RF signal of said first down-link frequency band and providing the modulated output as said down-link optical signal to said down-link optical fiber; and said N radio access units each comprise: a down-link optical demultiplexer for extracting a down-link optical signal of a different wavelength from said down-link optical fiber; a down-link opto/electric converter for converting said down-link optical signal, extracted by said down-link optical demultiplexer, into an electric RF signal; a first down-link filter for extracting a first down-link RF signal of said first down-link frequency band from said electric RF signal and providing said first down-link extracted RF signal to said antenna means; and a second down-link filter for extracting a second down-link RF signal of said second down-link frequency band from said electric RF signal and providing said second down-link RF signal to said antenna means.

11. A communication system using optical fibers, said communication system comprising:

down- and up-link optical fibers;

N radio access units, each of which has antenna means, connected to said down- and up-link optical fibers, converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively; converts a down-link RF signal input to each of said input/output terminals into an optical signal, and sends the converted optical signal as said down-link optical signal via said down-link optical fiber to those of said radio access units corresponding said first and second communication systems; and converts said up-link optical signal, sent over said up-link optical fiber from said radio access units corresponding to said first and second communication systems, into an up-link RF signal, and providing an up-link RF signal input to each of said input/output terminal corresponding said first and second communication systems;

said divider/combiner unit receives a radio RF signal of a first down-link frequency band at one of input terminals of said plurality of input/output terminals and N radio RF signals of a second down-link frequency band different from said first down-link frequency band at the other N input terminals of said plurality of input/output terminals; said divider/combiner unit comprises: N down-link electro/optic converters for converting said N radio RF signals of said second down-link frequency band into optical signals of different wavelengths; a down-link optical multiplexer for multiplexing said optical signals from said N down-link electro/optic converters; and an external optical modulator for externally modulating the multiplexed optical signal from said down-link optical multiplexer by said radio RF signal of said first down-link frequency band and providing the modulated output as said down-link optical signal to said down-link optical fiber; and said N radio access units each comprise: a down-link optical demultiplexer for extracting a down-link optical signal of a different wavelength from said down-link optical fiber; a down-link opto/electric converter for converting said down-link optical signal, extracted by said down-link optical demultiplexer, into an electric RF signal; a first down-link filter for extracting a first down-link RF signal of said first down-link frequency band from said electric RF signal and providing said first down-link extracted RF signal to said antenna means; and a second down-link filter for extracting a second down-link RF signal of said second down-link frequency band from said electric RF signal and providing said second down-link RF signal to said antenna means.

12. The communication system of claim 10 or 11, wherein:

said N radio access unit each comprises: a first up-link filter for extracting a first up-link RF signal of a first up-link frequency band from a received signal of said antenna means; a second up-link filter for extracting a second up-link RF signal of a second up-link frequency band different from said first up-link frequency band from said received signal of said antenna means; an up-link combiner for combining said first and second up-link RF signals from said first and second up-link filters; an up-link electro/optic converter for converting the output from said up-link combiner into an optical signal of a different wavelength; and an up-link optical multiplexer for providing said converted optical signal as said up-link optical signal to said up-link optical fiber; and said divider/combiner unit comprises: an up-link optical divider for dividing said optical signal from said up-link optical fiber into two optical signals; a first up-link opto/electric converter for converting one of said two optical signals from said up-link optical divider into a first up-link electric signal; a third up-link filter for extracting said first up-link RF signal of said first up-link frequency band from said first up-link electric signal converted by said first up-link opto/electric converter and providing said extracted first up-link RF signal to one of outputs of said input/output terminals; an up-link optical demultiplexer for demultiplexing the other optical signal divided by said optical divider into N optical signals of different wavelengths; N second up-link opto/electric converters for converting said N optical signals of different wavelengths into N second up-link electric RF signals; and N fourth up-link filters for extracting N second up-link RF signals of different frequencies in said second up-link frequency band from said second up-link electric signals converted by said N second up-link opto/electric converters and providing said N extracted second up-link RF signals to the other remaining N output terminals of said plurality of input/output terminals.

13. The communication system of claim 12, wherein: said antenna means of each of said radio access units has a first antenna for transmitting and receiving RF signals of said first up- and down-link frequency bands, and a second antenna for transmitting and receiving RF signals of said second up- and down-link frequency bands; and each of said radio access units has a first duplexer for providing said RF signal of said first up-link frequency band received by said first antenna to said first up-link filter and for providing the output RF signal from said first down-link filter to said first antenna, and a second duplexer for providing said RF signal of said second up-link frequency band received by said second antenna to said second up-link fourth filter and for providing the output RF signal from said second down-link filter to said second antenna.

14. A communication system using, optical fibers, said communication system comprising:

down- and up-link optical fibers;

N radio access units, each of which has antenna means, connected to said down- and up-link optical fibers converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1;

a divider/combiner unit which has a plurality of input/output terminals; connected to first and second communication systems corresponding to said plurality of input/output terminals, together with said down- and up-link optical fibers and said N radio access units connected to said down- and up-link optical fibers, respectively: converts a down-link RF signal input to each of said input/output terminals into an optical signal, and sends the converted optical signal as said down-link optical signal via said down-link optical fiber to those of said radio access units corresponding said first and second communication systems: and converts said up-link optical signal, sent over said up-link optical fiber from said radio access units corresponding to said first and second communication systems, into an up-link RF signal and providing an up-link RF signal input to each of said input/output terminal corresponding said first and second communication systems; and said first and second communication systems which are: a single-cell communication system for causing said N radio access units to function as a single cell corresponding to one of said plurality of input/output terminals; and a multi-cell communication system for causing said N radio access units to function as N multiple cells corresponding to the remaining N of said plurality of input/output terminals, said N radio access unit each comprises: a first up-link filter for extracting a first up-link RF signal of a first up-link frequency band from a received signal of said antenna means; a second up-link filter for extracting a second up-link RF signal of a second up-link frequency band different from said first up-link frequency band from said received signal of said antenna means; an up-link combiner for combining said first and second up-link RF signals from said first and second up-link filters; an up-link electro/optic converter for converting the output from said up-link combiner into an optical signal of a different wavelength; and an up-link optical multiplexer for providing said converted optical signal as said up-link optical signal to said up-link optical fiber; and said divider/combiner unit comprises: an up-link optical divider for dividing said optical signal from said up-link optical fiber into two optical signals; a first up-link opto/electric converter for converting one of said two optical signals from said up-link optical divider into a first up-link electric signal; a third up-link filter for extracting said first up-link RF signal of said first up-link frequency band from said first up-link electric signal converted by said first up-link opto/electric converter and providing said extracted first up-link RF signal to one of outputs of said input/output terminals; an up-link optical demultiplexer for demultiplexing the other optical signal divided by said optical divider into N optical signals of different wavelengths; N second up-link opto/electric converters for converting said N optical signals of different wavelengths into N second up-link electric RF signals; and N fourth up-link filters for extracting N second up-link RF signals of different frequencies in said second up-link frequency band from said second up-link electric signals converted by said N second up-link opto/electric converters and providing said N extracted second up-link RF signals to the other remaining N output terminals of said plurality of input/output terminals.

15. A communication system using optical fibers, said communication system comprising:

down- and up-link optical fibers;

N radio access units, each of which has antenna means, connected to said down- and up-link optical fibers, converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively; converts a down-link RF signal input to each of said input/output terminals into an optical signal, and sends the converted optical signal as said down-link optical signal via said down-link optical fiber to those of said radio access units corresponding said first and second communication systems; and converts said up-link optical signal, sent over said up-link optical fiber from said radio access units corresponding to said first and second communication systems, into an up-link RF signal, and providing an up-link RF signal input to each of said input/output terminal corresponding said first and second communication systems;

said N radio access unit each comprises: a first up-link filter for extracting a first up-link RF signal of a first up-link frequency band from a received signal of said antenna means; a second up-link filter for extracting a second up-link RF signal of a second up-link frequency band different from said first up-link frequency band from said received signal of said antenna means; an up-link combiner for combining said first and second up-link RF signals from said first and second up-link filters; an up-link electro/optic converter for converting the output from said up-link combiner into an optical signal of a different wavelength; and an up-link optical multiplexer for providing said converted optical signal as said up-link optical signal to said up-link optical fiber; and said divider/combiner unit comprises: an up-link optical divider for dividing said optical signal from said up-link optical fiber into two optical signals; a first up-link opto/electric converter for converting one of said two optical signals from said up-link optical divider into a first up-link electric signal; a third up-link filter for extracting said first up-link RF signal of said first up-link frequency band from said first up-link electric signal converted by said first up-link opto/electric converter and providing said extracted first up-link RF signal to one of outputs of said input/output terminals; an up-link optical demultiplexer for demultiplexer the other optical signal divided b said optical divider into N optical signals of different wavelengths; N second up-link opto/electric converters for converting said N optical signals of different wavelengths into N second up-link electric RF signals; and N fourth up-link filters for extracting N second up-link RF signals of different frequencies in said second up-link frequency band from said second up-link electric signals converted by said N second up-link opto/electric converters and providing said N extracted second up-link RF signals to the other remaining N output terminals of said plurality of input/output terminals.

16. The communication system of claim 14 or 15, wherein: said antenna means of each of said radio access units has a first antenna for transmitting and receiving RF signals of said first up- and down-link frequency bands, and a second antenna for transmitting and receiving RF signals of said second up- and down-link frequency bands; and each of said radio access units has a first duplexer for providing said RF signal of said first up-link frequency band received by said first antenna to said first up-link filter and for providing the output RF signal from said first down-link filter to said first antenna, and a second duplexer for providing said RF signal of said second up-link frequency band received by said second antenna to said second up-link fourth filter and for providing the output RF signal from said second down-link filter to said second antenna.

17. A communication system using optical fibers, said communication system comprising:

down- and up-link optical fibers;

N radio access units, each of which has antenna means connected to said down- and up-link optical fibers converts a down-link optical signal received from said down-link optical fiber to a down-link RF signal and sends said down-link RF signal by said antenna means, and converts an up-link-RF signal received by said antenna means to an up-link optical signal and sends said up-link optical signal to said up-link optical fiber said N being an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers; respectively; converts a down-link RF signal input to each of said input/output terminals into an optical signal, and sends the converted optical signal as said down-link optical signal via said down-link optical fiber to those of said radio access units corresponding said first and second communication systems, and converts said up-link RF optical signal, sent over said up-link optical fiber from said radio access units corresponding to said first and second communication systems, into an up-link RF signal, and providing an up-link RF signal input to each of said input/output terminal into an optical signal, and sends the converted optical signal as said down-link optical signal via said down-link optical fiber to those of said radio access units corresponding said first and second communication systems;

said first communication system which: is a system on which a single-cell formed by said N radio access units operates K-fold in correspondence to K of said input/output terminals; and said second communication system which: is a system on which multiple cells formed by said N radio access units operate L-fold in correspondence to the remaining L sets of input/output terminals, each of said L sets being composed of N input/output terminals.

18. The communication system of claim 17, wherein, first down-link RF signals of K different frequency bands $F_{A-1}, \ldots, F_{A-K}$ are input to K input terminals of said plurality of input/output terminals, and second down-link RF signals of different frequency bands $F_{B-1}, \ldots, F_{B-L}$, are input to L sets of remaining input terminals, said each of L set being composed of N input terminals;

said divider/combiner unit comprises:

K down-link dividers for dividing said down-link RF frequency signals of said K down-link frequency bands $F_{A-1}, \ldots, F_{A-K}$ input to said K input terminals of said plurality of input/output terminals into N down-link RF signals;

N down-link multiplexers, an i-th one of which, letting i=1, . . . , N, multiplexes i-th outputs from respective said K down-link dividers and said down-link RF signals from respective i-th input terminals of said L sets of input terminals;

N down-link electro/optic converters each for converting the multiplexed output from one of said N down-link multiplexers into optical signals of N different wavelengths $\lambda_1, \ldots, \lambda_N$; and a down-link optical multiplexer for multiplexing the output optical signals from said N down-link electro/optic converters and providing the multiplexed optical signal as a down-link optical signal to said down-link optical fiber; and an i-th one of said N radio access units comprises:

a down-link optical demultiplexer for extracting said down-link optical signal of the wavelength $\lambda_i$ from said down-link optical signal on said down-link optical fiber;

a down-link opto/electric converter for converting said extracted down-link optical signal into an electric signal; and a down-link demultiplexer for extracting K RF signals of said frequency bands $F_{A-1}, \ldots, F_{A-K}$ and L RF signals of said frequency bands $F'_{B-1}, \ldots, F'_{B-L}$ from the electric signal converted by said down-link opto/electro converter.

19. The communication system of claim 18, wherein said i-th radio access unit further comprises:

K+L up-link filters for extracting K up-link RF signals of frequency bands $F'_{A-1}, \ldots, F'_{A-K}$ and L up-link RF signals of frequency bands $F'_{B-1}, \ldots, F'_{B-L}$ from a received signal of said antenna means;

an up-link multiplexer for multiplexing said RF signals extracted by said K+L up-link filters;

an up-link electro/optic converter for converting the multiplexed output from said up-link multiplexer into an optical signal of a wavelength $\lambda_1$; and an up-link optical multiplexer for the converted optical signal from said up-link electro/optic converter providing as an up-link optical signal to said up-link optical fiber; and said divider/combiner unit comprises:

an optical demultiplexer for demultiplexing said up-link optical signal from said up-link optical fiber into optical signals of said N wavelengths;

N up-link opto/electric converters for converting said up-link optical signals of said N wavelengths into electric signals;

N up-link demultiplexers each supplied with the output electric signal from one of said N up-link opto/electric converters, an i-th one of said N up-link demultiplexers separating the electric signal applied thereto into said K RF signals of said frequency bands $F'_{A-1}, \ldots, F'_{A-K}$ and said L RF signals of said frequency bands $F'_{B-1}, \ldots, F'_{B-L}$; and K up-link combiners, a j-th one of which receives from said N up-link demultiplexers the RF signals of the frequency band $F'_{A-j}$, where j=1, . . . , K, and combines said RF signals and outputs the combined output to a j-th one of K output terminals of said plurality of input/output terminals;

wherein the L RF signals of said frequency bands $F'_{B-1}, \ldots, F'_{B-L}$ from said i-th up-link demultiplexer are output to i-th output terminals of L sets of the remaining N output terminals of said plurality of input/output terminals.

20. A communication system of using optical fibers, said communication system comprising:

down- and up-link optical fibers;

N radio access units, each of which has antenna means, connected to said down- and up-link optical fibers, converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1;

a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively; converts a down-link RF signal input to each of said input/output terminals into an optical signal, and sends the converted optical signal as said down-link optical signal via said down-link optical fiber to those of said radio access units corresponding said first and second communication systems; and converts said up-link RF optical signal, sent over said up-link optical fiber from said radio access units corresponding to said first and second communication systems, into an up-link RF signal, and providing an up-link RF signal input to each of said input/output terminal into an optical signal, and sends the converted optical signal as said down-link optical signal via said down-link optical fiber to those of said radio access units corresponding said first and second communication systems;

said first and second communication systems which: are a pair of K communication systems that are implemented by causing a single cell, formed by said N radio access units, to operate K-fold, where K is an integer equal to or greater than 2;

said divider/combiner unit comprises:

K down-link dividers each for dividing one of K down-link RF signals of frequency bands $F_{A-1}, \ldots, F_{A-K}$, provided to K input terminals of said plurality of input/output terminals, into N down-link RF signals;

N down-link multiplexers each for multiplexing said K down-link RF signals from said K down-link dividers;

N down-link electro/optic converters for converting the outputs from said N down-link multiplexers into optical signals of different wavelengths $\lambda_1, \ldots, \lambda_N$, respectively; and a down-link optical multiplexer for multiplexing said optical signals from said N down-link electro/optic converters and providing the multiplexed optical signal as a down-link optical signal to said down-link optical fiber; and wherein, letting i=1, . . . ,N, an i-th one of said N radio access units comprises:

a down-link optical demultiplexer for extracting the down-link optical signal of the wavelength $\lambda_i$ from said down-link optical signal on said down-link optical fiber;

a down-link opto/electric converter for converting said down-link optical signal extracted by said down-link optical demultiplexer into an electric signal; and a down-link demultiplexer for extracting said K down-link RF signals of said frequency bands $F_{A-1}. \ldots, F_{AK}$ from said electric signals extracted by said down-link opto/electric converter and providing said K down-link RF signals to said antenna means.

21. The communication system of claim 20, wherein said i-th radio access unit further comprises:

K up-link filters for extracting up-link RF signals of frequency bands $F'_{A-1}, \ldots, F'_{A-K}$ from a received signal of said antenna means;

an up-link multiplexer for multiplexing said up-link RF signals from said K up-link filters;

an up-link electro/optic converter for converting the output from said up-link multiplexer into an optical signal of the wavelength $\lambda_i$; and an up-link optical multiplexer for providing said optical signal from said up-link electro/optic converter as an up-link optical signal to said up-link optical fiber; and said divider/combiner unit comprises:

an up-link optical demultiplexer for demultiplexing said up-link optical signal from said up-link optical fiber into N up-link electric signals of said wavelengths $\lambda_1, \ldots, \lambda_N$;

N up-link opto/electric converters for said N up-link optical signals from said up-link optical demultiplexer into electric signals;

N up-link demultiplexers each for demultiplexing said electric signal from corresponding one of said N up-link opto/electric converters into K RF signals of said frequency bands $F'_{A-1}, \ldots, F'_{A-K}$; and K combiners for combining said RF signals of respective frequencies, each supplied from one of said N up-link combiners, into up-link RF signals of said frequency bands $F'_{A-1}, \ldots, F'_{A-K}$ and providing said combined RF signals to K output terminals of said input/output terminals, respectively.

22. A communication system using optical fibers, said communication system comprising:

down- and up-link optical fibers;

N radio access units each of which has antenna means connected to said down- and up-link optical fibers, converts a down-link optical signal received from said down-link optical fiber to a down-link RF signal and sends said down-link RF signal by said antenna means, and converts an up-link RF signal received by said antenna means to an up-link optical signal and sends said up-link optical signal to said up-link optical fiber, said N being an integer equal to or greater than 1, a divider/combiner unit which: has a plurality of input/output terminals; connected to first and second communication systems corresponding to said plurality of input/output terminals, together with said down- and up-link optical fibers and said N radio access units connected to said down- and up-link optical fibers, respectively; converts a down-link RF signal input to each of said input/output terminals into an optical signal and sends the converted optical signal as said down-link optical signal via said down-link optical fiber to those of said radio access units corresponding said first and second communication systems; and converts said up-link RF optical signal, sent over said up-link optical fiber from said radio access units corresponding to said first and second communication systems, into an up-link RF signal, and providing an up-link RF signal input to each of said input/output terminal into an optical signal, and sends the converted optical signal as said down-link optical signal via said down-link optical fiber to those of said radio access units corresponding said first and second communication systems;

said first and second communication systems which: are a pair of L communication systems that are implemented by causing a single cell, formed by said N radio access units, to operate L-fold, where L is an integer equal to or greater than 2, and down-link RF signals of frequency bands $F_{B-1}, \ldots, F_{B-L}$ are provided to L sets of N input terminals of said plurality of input/output terminals; and wherein, letting i=1, . . . , N, said divider/combiner unit comprises:

N down-link multiplexers, an i-th one of which combines said down-link RF signals from i-th input terminals of said L sets of input terminals;

N down-link electro/optic converters for converting the outputs from said N down-link multiplexers into optical signals of different wavelengths $\lambda_1, \ldots, \lambda_N$; and a down-link optical multiplexer for multiplexing said optical signals from said N down-link electro/optic converters and providing the multiplexed output as a down-link optical signal to said down-link optical fiber; and an i-th one of said N radio access units comprises:

a down-link optical demultiplexer for extracting the optical signal of the wavelength k; from said down-link optical signal on said down-link optical fiber;

an opto/electric converter for converting said down-link optical signal from said down-link optical demultiplexer into an electric signal; and a down-link demultiplexer for extracting said down-link RF signals of said frequency bands $F_{B-1}, \ldots, F_{B-L}$ from said electric signal converted by said down-link opto/electric converter and providing said extracted down-link RF signals to said antenna means.

23. The communication system of claim 22, wherein: said i-th radio access unit comprises:

L up-link filters for extracting up-link RF signals of frequency bands $F'_{B-1}, \ldots, F'_{B-L}$ from a signal received by said antenna means;

an up-link multiplexer for multiplexing the outputs from said L up-link filters;

an up-link electro/optic converter for converting the output from said up-link multiplexer into an optical signal of said wavelength $\lambda_i$; and an up-link optical multiplexer for providing said optical signal from said up-link electro/optic converter as an up-link optical signal to said up-link optical fiber; and said divider/combiner unit comprises:

an up-link optical demultiplexer for demultiplexing said up-link optical signal from said up-link optical fiber into N up-link optical signals of said wavelengths $\lambda_1, \ldots, \lambda_N$;

N opto/electric converters for converting said N up-link optical signals from said up-link optical demultiplexer into N electric signals; and N up-link demultiplexers each for demultiplexing said electric signal from one of said N up-link opto/electric converters into up-link RF signals of different frequencies; and wherein an i-th one of said N up-link demultiplexers said electric signal into up-link RF signals of said frequency bands $F'_{B-1}, \ldots, F'_{B-L}$ and outputs said up-link RF signals to i-th ones of output terminals of L sets of N output terminals of said plurality of input/output terminals.

* * * * *